(12) United States Patent
Takahashi et al.

(10) Patent No.: US 7,740,100 B2
(45) Date of Patent: Jun. 22, 2010

(54) COVER STRUCTURE FOR BUGGY VEHICLE

(75) Inventors: Shinji Takahashi, Saitama (JP); Kenzo Shimizu, Saitama (JP); Seiji Hanafusa, Saitama (JP); Takao Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 983 days.

(21) Appl. No.: 11/391,305

(22) Filed: Mar. 29, 2006

(65) Prior Publication Data

US 2006/0231308 A1 Oct. 19, 2006

(30) Foreign Application Priority Data

| Mar. 29, 2005 | (JP) | ............................. 2005-094497 |
| Jun. 13, 2005 | (JP) | ............................. 2005-171967 |
| Jun. 13, 2005 | (JP) | ............................. 2005-171968 |
| Jun. 13, 2005 | (JP) | ............................. 2005-171969 |

(51) Int. Cl.
  *B60R 13/04* (2006.01)
(52) U.S. Cl. .................. 180/311; 296/191; 296/193.05
(58) Field of Classification Search ................ 180/311, 180/210; 296/191, 193.05, 198, 205, 75
  See application file for complete search history.

(56) References Cited

U.S. PATENT DOCUMENTS

| 4,535,869 | A * | 8/1985 | Tsutsumikoshi et al. .... 180/311 |
| 6,533,055 | B2 * | 3/2003 | Matsuura et al. ........... 180/89.1 |
| 6,948,581 | B2 * | 9/2005 | Fecteau et al. .............. 180/210 |
| 7,048,293 | B2 * | 5/2006 | Bedard ........................ 280/291 |
| 7,097,188 | B2 * | 8/2006 | Takeshima et al. .......... 280/163 |
| 7,216,912 | B2 * | 5/2007 | Takeshima ................. 296/37.1 |
| 7,350,854 | B2 * | 4/2008 | Harper ........................ 296/198 |
| 2004/0124032 | A1 * | 7/2004 | Iizuka et al. ................. 180/311 |

FOREIGN PATENT DOCUMENTS

| JP | S56-43074 | | 4/1981 |
| JP | 1-29194 | Y2 | 9/1989 |
| JP | 02011484 | A * | 1/1990 |
| JP | 03104793 | A * | 5/1991 |
| JP | 03136993 | A * | 6/1991 |
| JP | 03271088 | A * | 12/1991 |
| JP | 04221286 | A * | 8/1992 |

(Continued)

*Primary Examiner*—Paul N Dickson
*Assistant Examiner*—Nicole Verley
(74) *Attorney, Agent, or Firm*—Birch, Stewart, Kolasch & Birch LLP

(57) ABSTRACT

A body cover being formed by joining together a plurality of cover members including a maintenance cover which is detachably disposed on the side of the power unit. A pedal which is actuated by an individual operating the vehicle wherein the overall body frame is covered without modifying the structure and arrangement of the pedal. A suspension system wherein a swing arm type or an independent suspension type may be used in the vehicle. A light structure for a tail light wherein attaching lighting components such as a light emitting section are attached to a substrate formed in part of a lid of a utility box attached to a rear part of a vehicle. The lighting components such as the substrate are directly assembled in the concave section, and a lens is attached to the concave section by welding.

8 Claims, 18 Drawing Sheets

FOREIGN PATENT DOCUMENTS

| | | |
|---|---|---|
| JP | 6-57542 B2 | 8/1994 |
| JP | 10-81280 A | 3/1998 |
| JP | 2000-302076 A | 10/2000 |
| JP | 2001-010580 | 1/2001 |
| JP | 2002-019665 | 1/2002 |
| JP | 2003-326985 | 11/2003 |

* cited by examiner

COVER STRUCTURE FOR BUGGY VEHICLE

CROSS-REFERENCE TO RELATED APPLICATIONS

The present application claims priority under 35 USC 119 to Japanese Patent Application Nos. 2005-171969; 2005-171967 and 2005-171968 filed on Jun. 13, 2005 and 2005-094497 filed Mar. 29, 2005 the entire contents of which are hereby incorporated by reference.

FIELD OF THE INVENTION

The present invention relates to a buggy vehicle in which a power unit, a fuel tank disposed above the power unit and an air cleaner disposed rearwardly of the power unit are mounted on a body frame. An operator seat is disposed rearwardly of the fuel tank and above the air cleaner. Step boards are disposed on both sides of the power unit in such a manner so that an operator positioned on the seat places her or his feet thereon. In particular, the invention relates to improvement of a cover structure. The present invention relates to a light structure and light attachment method for a light for a vehicle attached to a vehicle such as, for example an All Terrain Vehicle (ATV).

The present invention relates to a body frame of a buggy vehicle including a front frame for suspending front wheels, a center frame for mounting a power unit disposed rearwardly of the front wheels and is provided contiguously with the front frame, and a rear frame which has seat rails for supporting an operator seat and is provided contiguously with the center frame.

The present invention relates to a buggy vehicle in which a power unit is mounted on a body frame with an operator's seat on which an operator sits being attached to a body cover for covering the overall body frame as well as the power unit. A pedal is operatively trodden by the operator sitting on the seat and is disposed on the side of the power unit.

DESCRIPTION OF BACKGROUND ART

Japanese Utility Model Publication No. Hei 1-29194 discloses a buggy vehicle wherein the overall body frame is covered by an overall body cover that is integrally formed of a synthetic resin.

Since the overall body cover is formed integrally in the conventional buggy vehicle, the assembling of the body cover to the body frame is unsatisfactory. In addition, since it is necessary to remove the overall body cover for maintenance of the power unit, maintenance performance is also unsatisfactory.

A buggy vehicle is known that is configured such that a bracket is provided rearwardly of and below a center frame and the front portion of a swing arm is swingably supported by the bracket. See, Japanese Patent Laid-Open No. 2000-302076.

Rear suspension systems are known for all terrain vehicles that include the independent suspension type as well as the swing arm type as disclosed in Japanese Patent Laid-Open No. 2000-302076. Body frames having different structures have been individually used for such respective appropriate rear suspension systems. If the body frame can be shared by the swing arm type and the independent suspension type, however, a cost reduction can be achieved.

An all terrain vehicle is known wherein a brake pedal is disposed on the side of a power unit mounted on a body frame. See, for example, Japanese Patent Laid-Open No. Hei 10-81280.

Buggy vehicles such as all terrain Vehicles are generally configured such that a power unit is not surrounded and covered by a body cover. More specifically, the power unit is normally exposed to the outside as disclosed in Japanese Patent Laid-Open No. Hei 10-81280. Such conventional buggy vehicles have a gear change pedal and a brake pedal that are disposed outside from the body cover.

However, if a body cover is arranged to cover the overall body frame including a power unit in order to enhance the external appearance, it is necessary to dispose a pedal to be placed on the side of the power unit at a position not interfering with the body cover. With such an arrangement, it is desired to cover the overall body frame with the body cover without modifying the structure and arrangement of the pedal.

Conventionally, a light structure for a vehicle light is known wherein storage sections are provided in a vehicle and technology is available for attaching a light unit, formed by housing lamplight components such as a base and a light emitting body etc. within a case mounted in the storage sections for each case. See, for example, Japanese Patent Publication Hei. 6-57542.

However, since a light unit is inserted into the storage sections provided in the vehicle for each case, both the storage sections and the cases are required. Thus, there is a desire to reduce the number of components.

SUMMARY AND OBJECTS OF THE INVENTION

In view of the foregoing, the present invention has been made and it is an object of an embodiment of the present invention to provide a cover structure for a buggy vehicle for enhancing the external appearance by covering the overall body frame with a body cover for improving the assembling work and the maintenance performance of the power unit.

According to an embodiment of the present invention, a buggy vehicle is provided in which a power unit, a fuel tank disposed above the power unit and an air cleaner, disposed rearwardly of the power unit, are mounted on a body frame. An operator seat is disposed rearwardly of the fuel tank and above the air cleaner. Step boards, disposed on both sides of the power unit in such a manner that an operator on the seat places the operator's feet thereon, are attached to a body cover for covering the overall body frame as well as the power unit, the fuel tank and the air cleaner. The body cover is formed by joining together a plurality of cover members including a maintenance cover which is detachably disposed on the side of the power unit.

According to an embodiment of the present invention, the body cover is provided with a warm air exhaust port.

According to an embodiment of the present invention, the body cover is formed with an opening for observing an oil level gauge attached to the power unit.

According to an embodiment of the present invention, a knee grip and a mud guard, which are part of the plurality of cover members, are vertically spaced apart from each other so as to position the maintenance cover therebetween.

According to an embodiment of the present invention, the body cover includes the maintenance cover, the mud guard disposed below the maintenance cover, the knee grip disposed above the maintenance cover, a tank cover disposed forward of the knee grip and above the maintenance cover, and a front fender disposed forward of the maintenance cover, which serve as the cover members.

According to an embodiment of the present invention, since the body cover is adapted to cover the overall body frame as well as the power unit, the fuel tank and the air cleaner, the external appearance can be enhanced. In addition, the body cover is formed by joining together the plurality of cover members including the maintenance cover which is detachably disposed on the side of the power unit. Therefore, the assembling performance of the body cover can be enhanced by sequentially assembling the cover members. In addition, maintenance performance can be enhanced since it is needed only to attach and detach the maintenance cover when the power unit undergoes maintenance work.

According to an embodiment of the present invention, since warm air can be discharged from the warm air discharge port despite the provision of the full cover, heat does not accumulate within the body cover.

According to an embodiment of the present invention, the oil level gauge can be checked without detachment of the maintenance cover.

According to an embodiment of the present invention, since the maintenance cover is disposed between the knee grip and the mud guard so as to provide a wide opening when the maintenance cover is opened, the maintenance performance can be enhanced.

According to an embodiment of the present invention, it is desirable that the mud guard, the knee grip, the tank cover and the front fender are disposed around the maintenance cover. Such an arrangement can improve the external appearance.

The present invention has been made and it is an object of an embodiment of the present invention to provide a body frame of a buggy vehicle that achieves a cost reduction by allowing the body frame to be shared by both the rear suspension systems, i.e., the swing arm type and the independent suspension type.

To achieve the above object, an embodiment of the present invention provides a body frame of a buggy vehicle that includes a front frame for suspending a front wheel, a center frame for mounting a power unit disposed rearwardly of the front wheel and is provided contiguously with the front frame and a rear frame which has a seat rail supporting an operator seat and is provided contiguously with the center frame. A lower bracket is attached to the center frame and is formed with a first support hole adapted to swingably support a swing arm suspending a rear wheel and a second support hole adapted to swingably support an independent frame suspending the rear wheel.

An embodiment of the present invention provides an upper bracket that is attached to the center frame or the rear frame and the upper bracket includes a first support portion for supporting an upper portion of a rear shock absorber unit connected to the swing arm and second support portions for supporting the independent suspension frame.

An embodiment of the present invention provides that the second support portions are provided integrally with the first support portion so as to expand to left and right sides of and from the first support portion.

An embodiment of the present invention provides that both lateral ends of each of the second support portions are welded to the center frame or the rear frame.

An embodiment of the present invention provides that the lower bracket is attached to the center frame and can be used for either of the rear suspension type, the swing arm type or the independent suspension type suspension systems. A portion of the body frame is allowed to be used for swingably supporting either of the swing arm and the independent suspension frame, which results in a cost reduction.

An embodiment of the present invention provides that the upper bracket is attached to the center frame or the rear frame and can be used for either of the rear suspension type, the swing arm type or the independent suspension type suspension systems. That is, the body frame is configured such that the upper bracket is applicable to either of the swing arm and the independent suspension frame, which results in a further cost reduction.

An embodiment of the present invention provides that the independent suspension frame can be securely held by the upper bracket.

An embodiment of the present invention provides that rigidity of the connection of the upper bracket with the center bracket or the rear frame can be enhanced, which can provide a more stabilized support of the independent suspension frame by the upper bracket.

In view of the foregoing, an embodiment of the present invention provides a buggy vehicle that enhances the external appearance by covering the overall body frame with a body cover without modifying the structure and arrangement of a pedal.

To achieve the above object, an embodiment of the present invention provides a buggy vehicle in which a power unit is mounted on a body frame having an operator seat on which an operator sits that is attached to a body cover for covering the overall body frame as well as the power unit. A pedal, which is operatively trodden by the operator sitting on the seat, is disposed on the side of the power unit. The pedal includes an arm having a pedestal portion which is located outside the body cover and is swingably supported by the power unit or the body frame and a treadle that is provided on the leading end of the arm so as to be outside the body cover, and on the side of the power unit the body cover is formed with an opening so as to allow the leading half of the arm to pass therethrough.

An embodiment of the present invention provides that the body cover is partially formed with an outwardly projecting portion. A portion of the arm on the proximal side thereof with respect to the middle portion thereof is disposed between the power unit and the projecting portion.

An embodiment of the present invention provides that the body cover includes a maintenance cover which is detachably disposed on the side of an engine constituting part of the power unit and a mud guard which is provided contiguously with an lower edge and a rear edge of the maintenance cover. The opening is defined by a notch and a rear edge of the maintenance cover. The notch is provided at a joint of the mud guard to the rear edge of the maintenance cover.

According to an embodiment of the present invention, without modifying the structure and arrangement of the pedal, the overall body frame can be covered by the body cover while allowing part of the pedal to project outwardly from the body cover. This can enhance the external appearance.

According to an embodiment of the present invention, a space is created between the body cover and the power unit that can be effectively utilized to dispose a part of the pedal therein.

According to an embodiment of the present invention, the opening can be effectively formed at the joint between the maintenance cover and the mud cover which constitutes part of the body cover while minimizing an area of the opening. This can also enhance external appearance.

According to an embodiment of the present invention, a light structure is provided having a case and a lens, with a coupler provided in the case. The case serves as a structural component of a vehicle.

According to an embodiment of the present invention, a utility box is provided in a rear section of the vehicle, and the case is a concave portion formed in a lid attached to the utility box. The concave portion is positioned at an upper end of the lid in a state where the lid is closed. The concave portion is formed spanning both ends of the lid in a lateral direction with the lens being attached to a peripheral edge of the concave portion.

The lens is flush with the lid. A utility box may be provided with the lid.

A light attachment method is disclosed for attaching lamplight components to a vehicle, wherein the lamplight components are directly fitted in structural components of the vehicle having the lamplight components formed capable of attachment, and a lens is fitted to the lamplight component.

According to an embodiment of the present invention, since in a light structure is provided with a case and a lens, the case functions as a structural component of the vehicle. Thus, it is possible to reduce the number of components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention will be described below with reference to the accompanying drawings.

Figure 1:
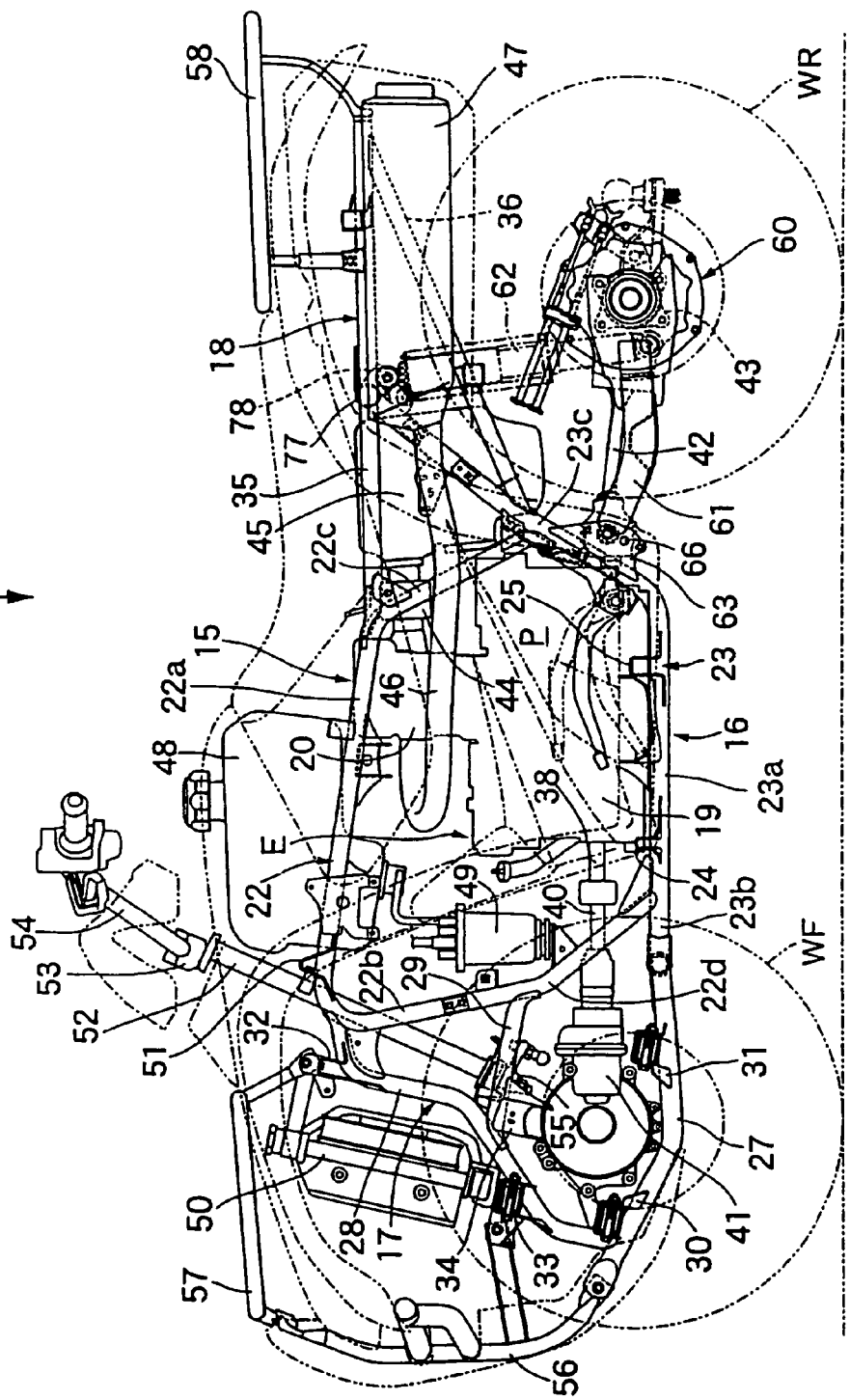
FIG. 1 is a side view of an all terrain vehicle employing a swing arm type rear suspension with its body cover removed.
Figure 2:
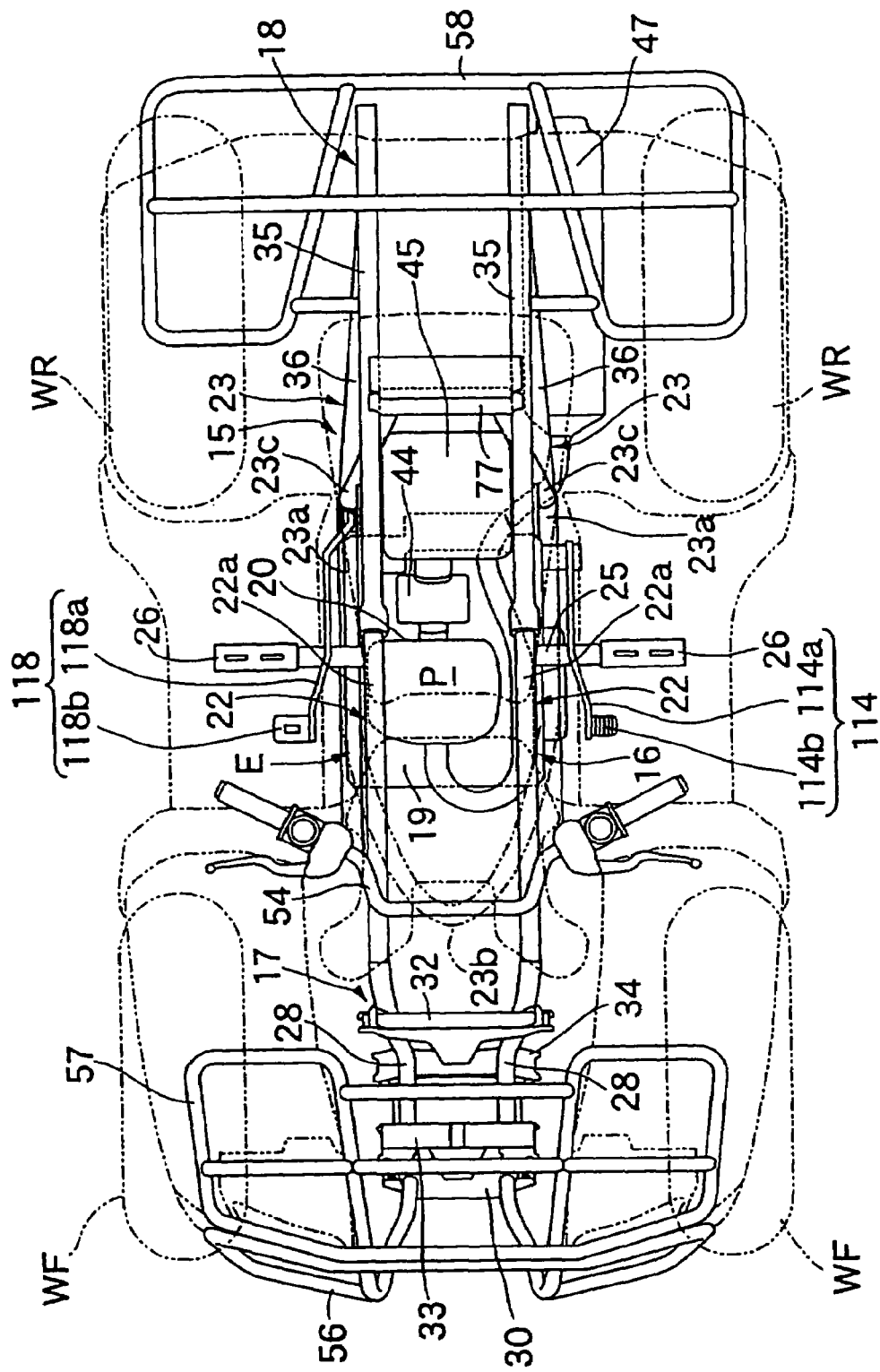
FIG. 2 is a view as viewed from arrow 2 of FIG. 1.

Referring first to FIGS. 1 and 2, the buggy vehicle is an all terrain vehicle which mainly enhances drivability on irregular ground. The vehicle includes a pair of left and right front wheels WF and a pair of left and right rear wheels WR both suspended by the front portion and rear portion, respectively, of a body frame 15. The front wheel WF has a low pressure balloon tire with a relatively large diameter attached thereto and the rear wheel WR has a low pressure balloon tire with a relatively small diameter attached thereto.

The body frame 15 is composed of multiple kinds of steel products that are joined together by welding or the like and includes a center frame 16, a front frame 17 and a rear frame 18. The center frame 16 mounts thereon a power unit P including an engine E and a transmission (not shown) incorporated in the crankcase 19 of the engine E. The front frame 17 is provided contiguously with the front part of the center frame 16 so as to suspend the front wheels WF. The rear frame 18 is provided contiguously with the rear part of the center frame 16 with seat rails 35 supporting an operator seat 107.

The center frame 16 includes a pair of left and right upper pipes 22 and a pair of left and right lower pipe 23, as main constituent elements. The upper pipe 22 includes an upper slant portion 22a, a front slant portion 22b and a rear slant portion 22c that are joined together as one piece. The upper slant portion 22a slants rearwardly and downwardly. The front slant portion 22b extends rearwardly and downwardly from the front end of the upper slant portion 22a so as to make an acute angle therewith. The rear slant portion 22c extends rearwardly and downwardly from the rear end of the upper slant portion 22a so as to make an obtuse angle therewith. The upper pipe 22 is formed by bending a single steel pipe. In addition, a bent portion 22d is formed at the middle of the front slant portion 22b to project forward.

On the other hand, the lower pipe 23 includes a lower horizontal portion 23a, a connection portion 23b and a rear slant portion 23c that are joined together as one piece. The lower horizontal portion 23a extends almost horizontally in the back-and-forth direction. The connection portion 23b extends inward from the front end of the lower horizontal portion 23a so as to bent to project forward. The rear slant portion 23c extends rearwardly and upwardly from the rear end of the lower horizontal portion 23a so as to make an acute angle therewith. The lower pipe is formed by bending a single steel pipe. The respective connection portions 23b of the pair of left and right lower pipes 23 are joined together.

The lower end of the front slant portion 22b included in the upper pipe 22 is joined to the front end of the lower horizontal portion 23a included in the lower pipe 23. The lower end of the rear slant portion 22c included in the upper pipe 22 is joined to the middle of the rear slant portion 23c included in the lower pipe 23. Thus, the upper pipe 22, the lower horizontal portion 23a of the lower pipe 23 and part of the rear slant portion 23c constitute a closed loop as viewed from the side. A cross member 24 is provided between both the lower horizontal portions 23a of the lower pipes 23 at a position rearwardly of the joint portions of the upper pipes 22. Positioned rearwardly of the cross member 24 a cross member 25 is provided between both the lower horizontal portions 23a in such a manner that both ends of the cross member 25 project laterally from the upper pipe 22. Step portions 26 are respectively attached to both the ends of the cross member 25.

The front frame 17 includes a pair of left and right front lower pipes 27, a pair of left and right front cushion pipes 28, and a pair of left and right front sub-pipes 29. The front lower pipes 27 have rear ends joined to the connection portions 23b of the lower pipes 23, respectively, in such a manner that its front halves slant forwardly and upwardly and its rear halves extend almost horizontally. The front cushion pipe 28 connects a joint portion between the upper slant portion 22a and the front slant portion 22b included in the upper pipe 22 with the front end of the front lower pipe 27. The front sub-pipe 29 connects the middle portion of the front cushion pipe 28 with the bent portion 22d at the middle of the front slant portion 22b included in the upper pipe 22.

The front cushion pipe 28 is formed like a crank such that its lower half is located forward of its upper half. A pair of cross members 30, 31 span between both the front lower pipes 27 in such a manner that the cross member 30 connects the front portions thereof and the cross member 31 connects the middle portions thereof. A pair of cross members 32, 33 span between both the front cushion pipes 28 in such a manner that the cross member 32 connects the upper portions thereof with each other and the cross member 33 the lower portions thereof. A cross member 34 spans between the front portions of both the front sub-pipes 29.

The rear frame 18 includes a pair of left and right seat rails 35, a pair of left and right rear sub-pipes 36, and the rear halves of the rear slant portions 23c included in the lower pipes 23. The seat rail 35 is joined at its front end to a joint portion between the upper slant portion 22a and the rear slant portion 22c with both included in the upper pipe 22 and extending therefrom rearwardly almost horizontally. The rear sub-pipe 36 connects the middle portion of the rear slant portion 23c included in the lower pipe 23 with the rear end of the seat rail 35. The rear halves of both the rear slant portions 23c are joined to the middle portions of both the seat rails 35, respectively.

The engine E of the power unit P includes e.g. a water-cooled single cylinder. The engine E is mounted on the center frame 16 of the body frame 15 in the so-called longitudinal layout in which the axis of a crankshaft not shown extends in the back-and-forth direction of the vehicle.

At a location offset to the left from the widthwise center of the vehicle, a front output shaft 38 and a rear output shaft 39 (described later with reference to FIG. 3) project forward and rearwardly from the front wall and rear wall, respectively, of the crankcase 19 included in the engine E. The rotary power of the front output shaft 38 is transmitted through a front drive shaft 40 and a front final reduction gear unit 41 to the left and right front wheels WF. Likewise, the rotary power of the rear output shaft is transmitted through a rear drive shaft 42 and a rear final reduction gear unit 43 to the left and right wheels WR.

The engine E includes a cylinder part 20 projecting upwardly from the crankcase 19. A throttle body 44 is joined to the rear portion of the cylinder part 20. An air cleaner 45 is joined to the upper end of the throttle body 44. An exhaust pipe 46 is joined at its upstream end to the front portion of the cylinder part 20. The exhaust pipe 46 extends forward of the cylinder part 20, then returns rearwardly therefrom, passing by the left of the cylinder part 20, further extending rearwardly, and is joined to the exhaust muffler 47 disposed inside the left rear wheel WR.

A fuel tank 48 is mounted on the center frame 16 of the body frame 15 so as to be disposed above the power unit P and forward of the air cleaner 45. A fuel pump 49 is disposed below the fuel tank 48. A radiator 50 is held by the front frame 17 of the body frame 15.

A cross member 51 spans between the front ends of the upper slant portions 22a included in the upper pipes 22, respectively. A steering column 52 which is located at the widthwise center of the vehicle is held by the cross member 51. A steering handlebar 54 is joined to the upper end of the steering shaft 53 that is steerably journaled by the steering column 52. The steering shaft 53 is joined at its lower end to a front wheel operation mechanism 55. Further, a front protector 56 and a front carrier 57 are attached to the front frame 17 of the body frame 15 and a rear carrier 58 is attached to the rear frame 18.

Figure 3:
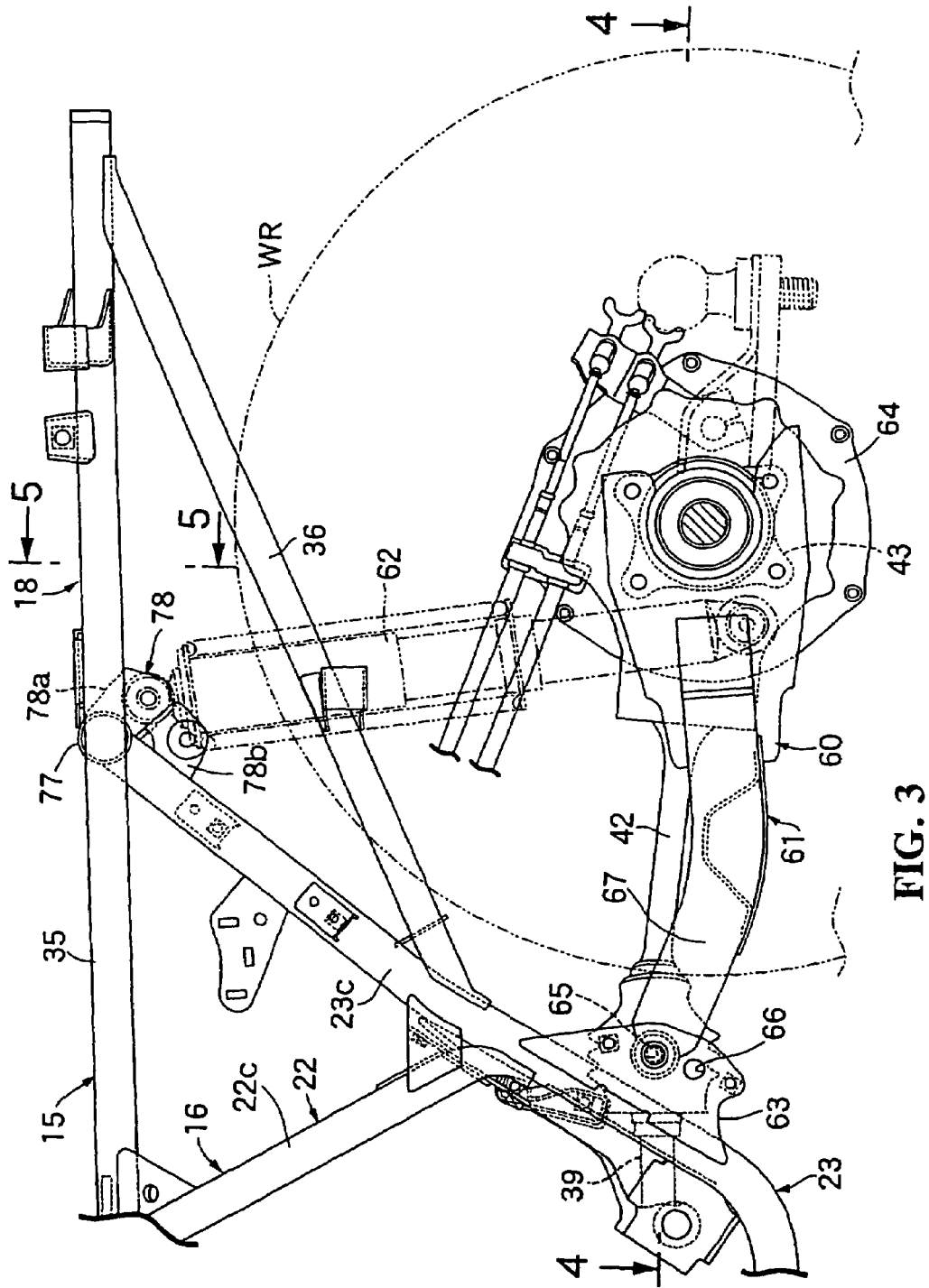
FIG. 3 is a side view of the swing arm type rear suspension.
Figure 4:
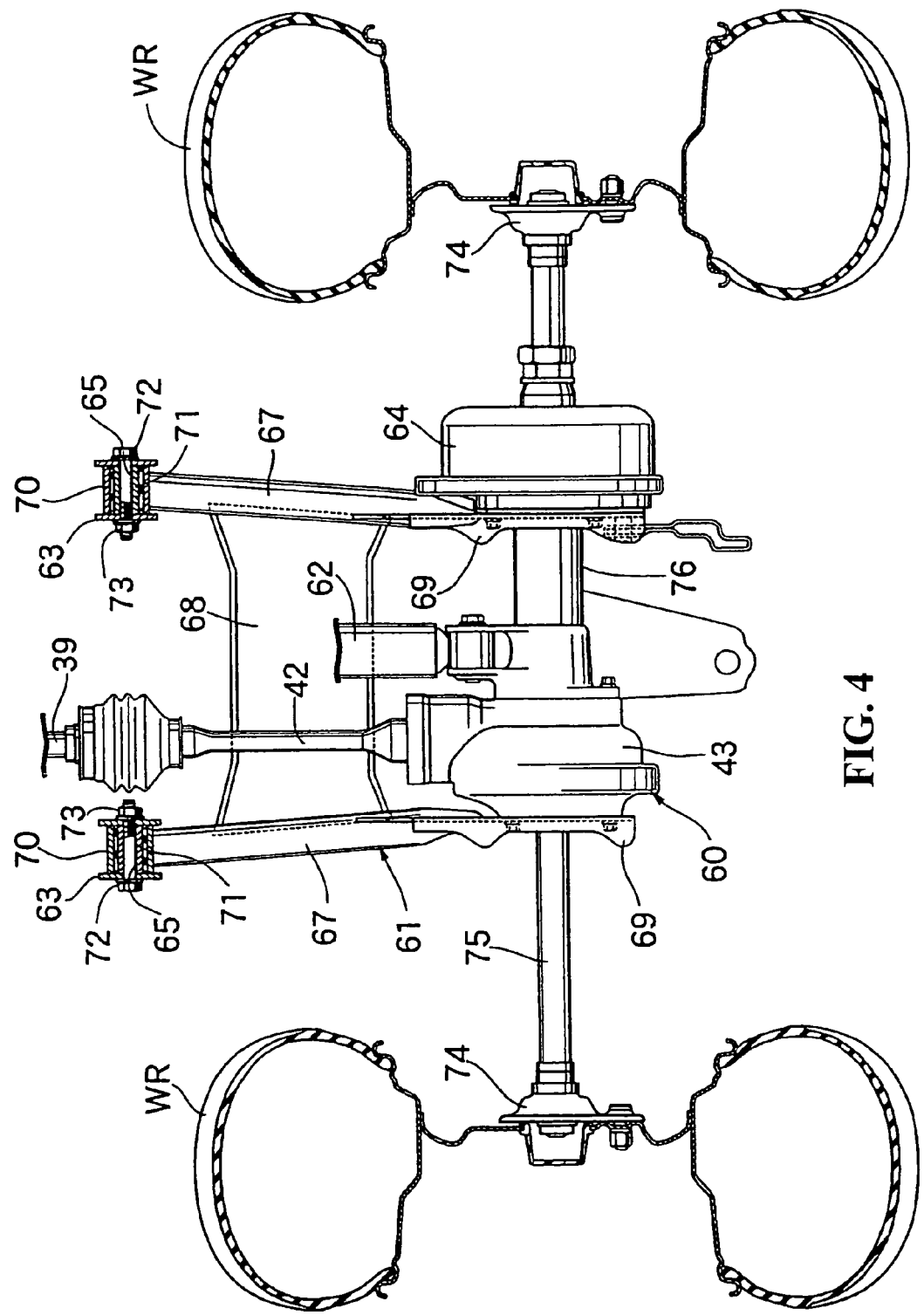
FIG. 4 is a cross-sectional view taken along line 4-4 of FIG. 3.

Referring to FIGS. 3 and 4, the left and right rear wheels WR are suspended by the body frame 15 through a swing arm type rear suspension 60, which includes a swing arm 61 and a rear shock absorber unit 62 as main constituent elements. The swing arm 61 is swingably supported at its front end by a pair of left and right lower brackets 63 attached to the center frame 16 of the body frame 15. In addition, the swing arm 61 is joined at its rear end to the rear final reduction gear unit 43 and a drum brake unit 64.

The lower brackets 63 are each attached to the rear lower portion of the center frame 16 included in the body frame 15. More specifically, in this embodiment, the lower brackets 63 are each welded to the lower rear side of the rear slant portion 23c included in each of both the lower pipes 23. The lower bracket 63 is formed in an almost-U-shape opening rearwardly. In addition, the lower bracket 63 is formed with a first support hole 65 and a second support hole 66 below the first support hole 65.

The swing arm 61 includes a pair of left and right arms 67 extending forwardly and rearwardly, a cross member 68 spans between both the arms 67, and support plates 69 attached to each of the rear portions of the arms 67.

Cylindrical pivot connections 70 having a widthwise extending axis are attached to the front ends of both the arms 67, respectively. A mounting rubber 71 is inserted into the pivot connection 70. A bolt 72 passes through the pivot connection 70 and the mount rubber 71 which are inserted into the lower bracket 63. A nut 73 is threaded to the bolt 72. Thus, the swing arm 61 is supported at its front end by the lower brackets 63 in a swingable manner.

The rear final reduction gear unit 43 is attached to the left support plate 69 and the drum brake unit 64 is attached to the right support plate 69. The rear final reduction gear unit 43 and the drum brake unit 64 are arranged coaxially with a rear axle shaft 75 spanning between the respective hubs 74 of the left and right rear wheels WR. In addition, they are connected to each other by a cylindrical axle housing 76 coaxially surrounding the rear axle shaft 75.

Figure 5:
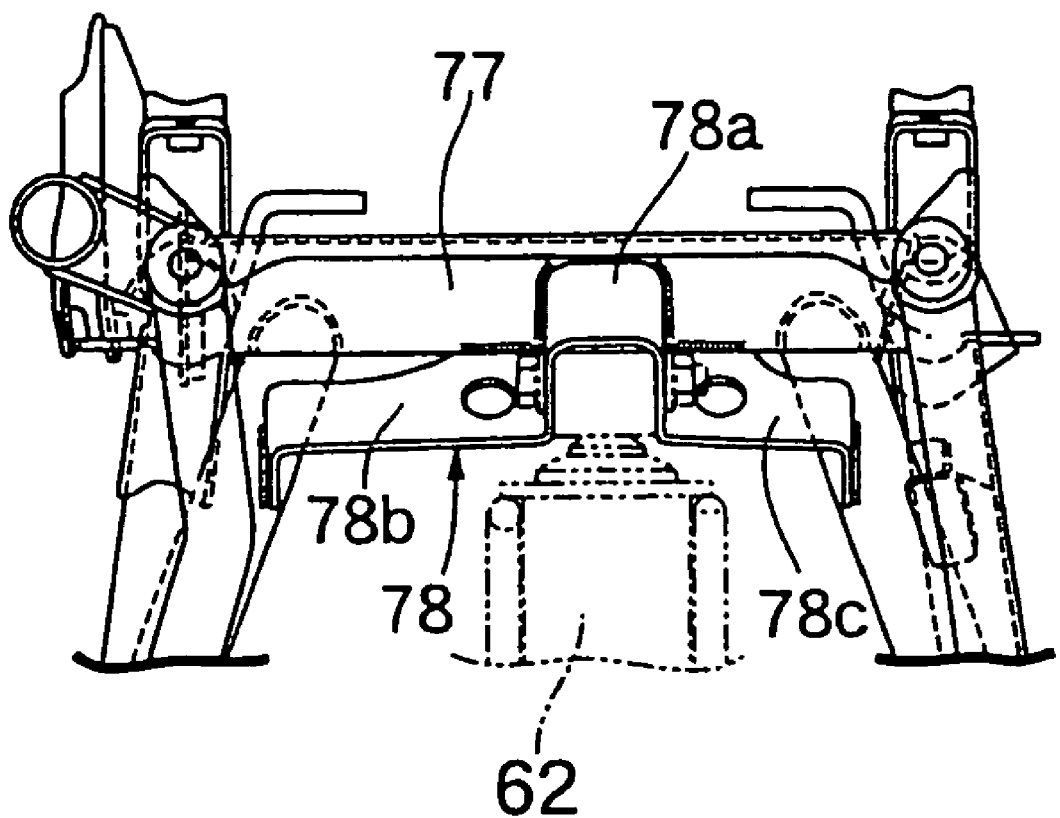
FIG. 5 is a cross-sectional view taken along line 5-5 of FIG. 3.

Referring to FIG. 5, both the seat rails 35 of the rear frame 18 are connected at middle portions to each other by a cross member 77. The rear ends of the rear slant portions 23c included in the lower pipes 23 are joined to the cross member 77. An upper bracket 78 is welded to the cross member 77. The upper bracket 78 includes a first support portion 78a, and a pair of left and right second support portions 78b, 78c. The second support portions 78b, 78c are integrally connected to the first support portion 78a so as to expand to the left and right sides of the first support portion 78a. Both the ends of each of the second support portions 78b, 78c are welded to the cross member 77.

The first support portion 78a is formed in an almost U-shape opening downwardly and holds the upper portion of the rear shock absorber unit 62. As shown in FIG. 4, the rear shock absorber unit 62 is connected at its lower end to the rear final reduction gear unit 43.

Figure 6:
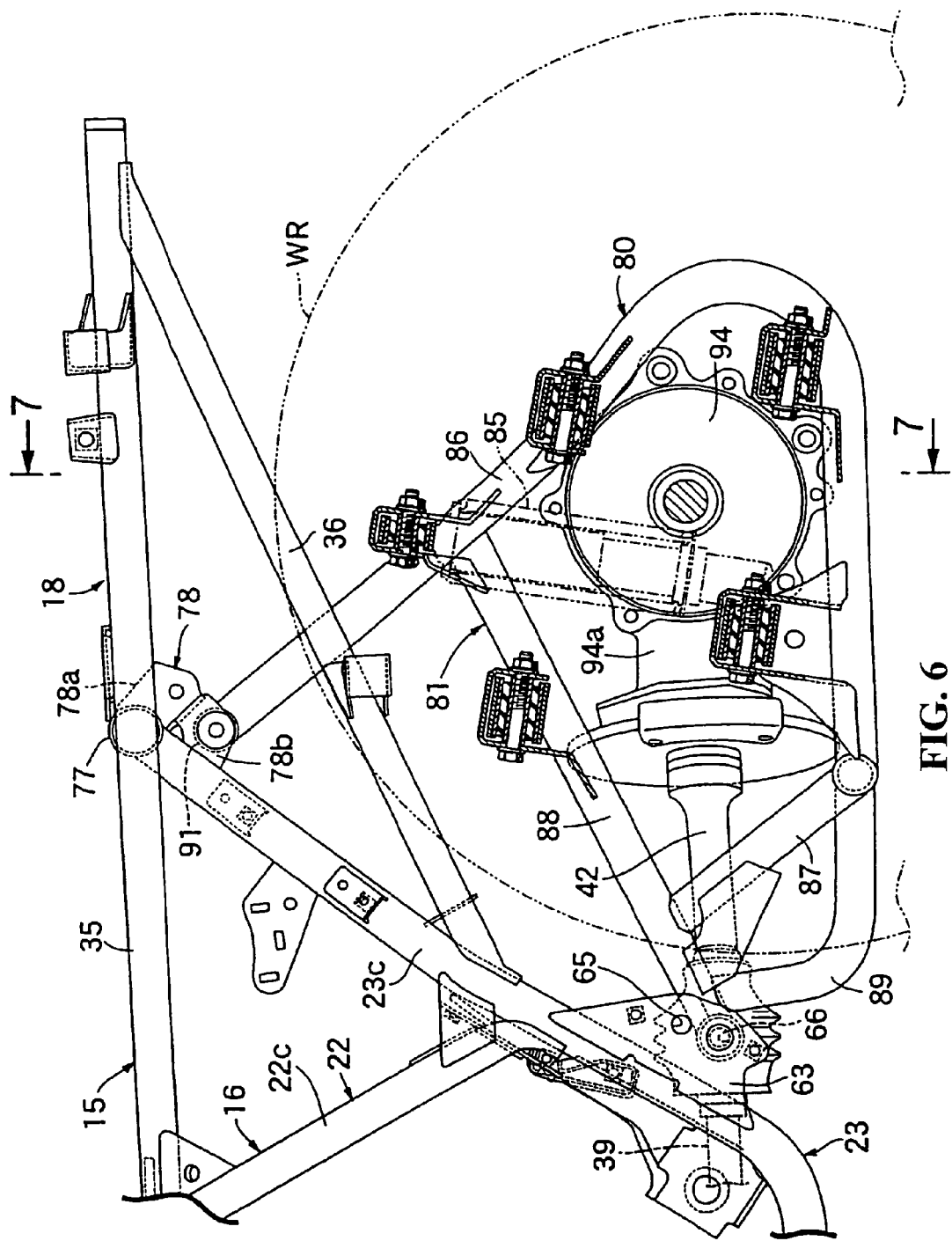
FIG. 6 is a side view of an independent rear suspension.
Figure 7:
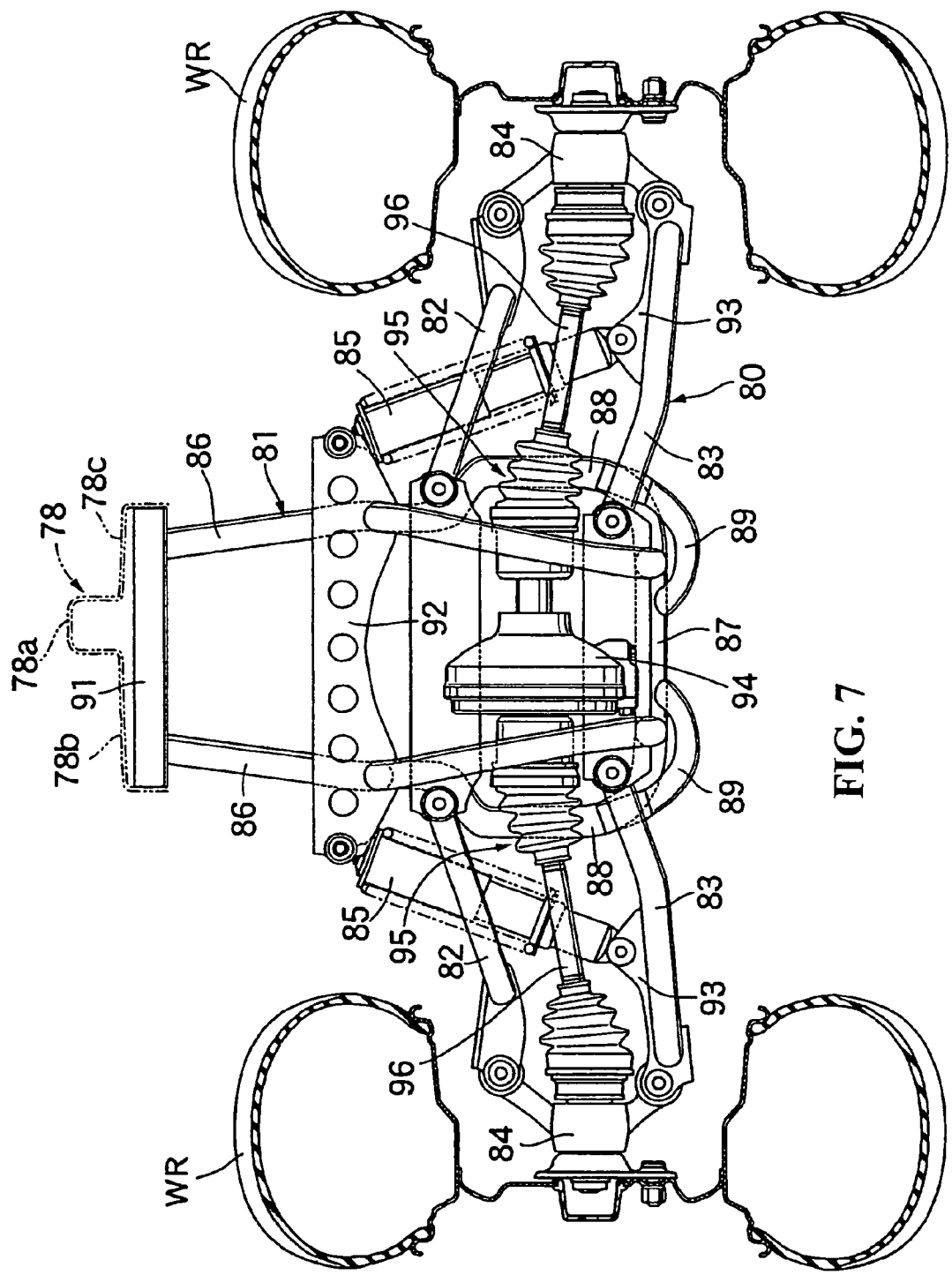
FIG. 7 is a cross-sectional view taken along line 7-7 of FIG. 6.

In addition, the lower brackets 63 and the upper bracket 78 can hold an independent rear suspension 80 as shown in FIGS. 6 and 7 in place of the swing arm type rear suspension described above.

The independent rear suspension 80 includes an independent suspension frame 81 held by the lower brackets 63 and the upper bracket 78, a pair of left and right upper arms 82 and a pair of left and right lower arm 83, which are each held at its proximal portion by the independent suspension frame 81 in a vertically swingable manner, left and right knuckles 84 held by corresponding ones of the leading ends of the upper arms 82 and lower arms 83 and a pair of left and right rear shock absorber units 85 interposed each between the independent frame 81 and a corresponding one of the lower arms 83.

The independent suspension frame 81 includes a pair of left and right rear cushion pipes 86, a rear cushion lower pipe 87, a pair of left and right rear cushion sub-pipes 88, and a pair of left and right sub-pipes 89. The rear cushion pipe 86 bends in an almost V-shape opening forward as a whole as viewed from the side. The rear cushion lower pipe 87 spans between the lower leading ends of the rear cushion pipes 86 and has both leading ends bending obliquely upwardly and forwardly. The rear cushion sub-pipe 88 has an intermediate portion to which the end of the rear cushion lower pipe 87 is joined, extends rearwardly and upwardly, and has a rear end joined to the middle portion of the rear cushion pipe 86. The sub-pipe 89 connects the front end of the rear cushion sub-pipe 88 with the rear cushion lower pipe 87.

Cylindrical pivot connections 90 each having an axis extending in the lateral direction are attached to the front ends of both the rear cushion sub-pipes 88, respectively. The pivot connections 90 are swingably supported with the second support holes 66 of the lower brackets 63, respectively, in the same structure as that where the swing arm 61 is swingably supported by the lower bracket 63. In this way, the independent suspension frame 81 is supported with the second support hole 66 located at a position lower than the first support hole 65 adapted to swingably support the swing arm 61. Thus, it is possible to arrange the lower portion of the independent suspension frame 81 at a level equal approximately to the lower horizontal portion 23 of the lower pipe 23 included in the center frame 16. Consequently, the independent suspension frame 81 is prevented from interfering with the obstacles as much as possible during to operation of the vehicle on irregular terrain.

Both of the rear cushion pipes 86 are provided at upper ends with a cylindrical pivot connection 91 extending in the lateral direction. This pivot connection 91 is swingably supported between a pair of the second support portions 78b, 78c included in the upper bracket 78.

The rear shock absorber units 85 are held at upper ends by both ends, respectively, of a cross member 92 spanning between the respective intermediate portions of the rear cushion pipes 86. In addition, the rear shock absorber units 85 are held at its lower ends by brackets 93 attached to the lower arms 83, respectively.

A rear final reduction gear unit 94 is connected to the rear portion of the independent suspension frame 81. The rear end of the rear drive shaft 42 is joined to the input portion 94a of the rear final reduction gear unit 94. Respective universal joints 95 are disposed on the left and right of the rear final reduction gear unit 94. The output of the rear final reduction gear unit 94 is transmitted to each of the left and right rear wheels WR through the universal joint 95 and the drive shaft 96.

Figure 8:
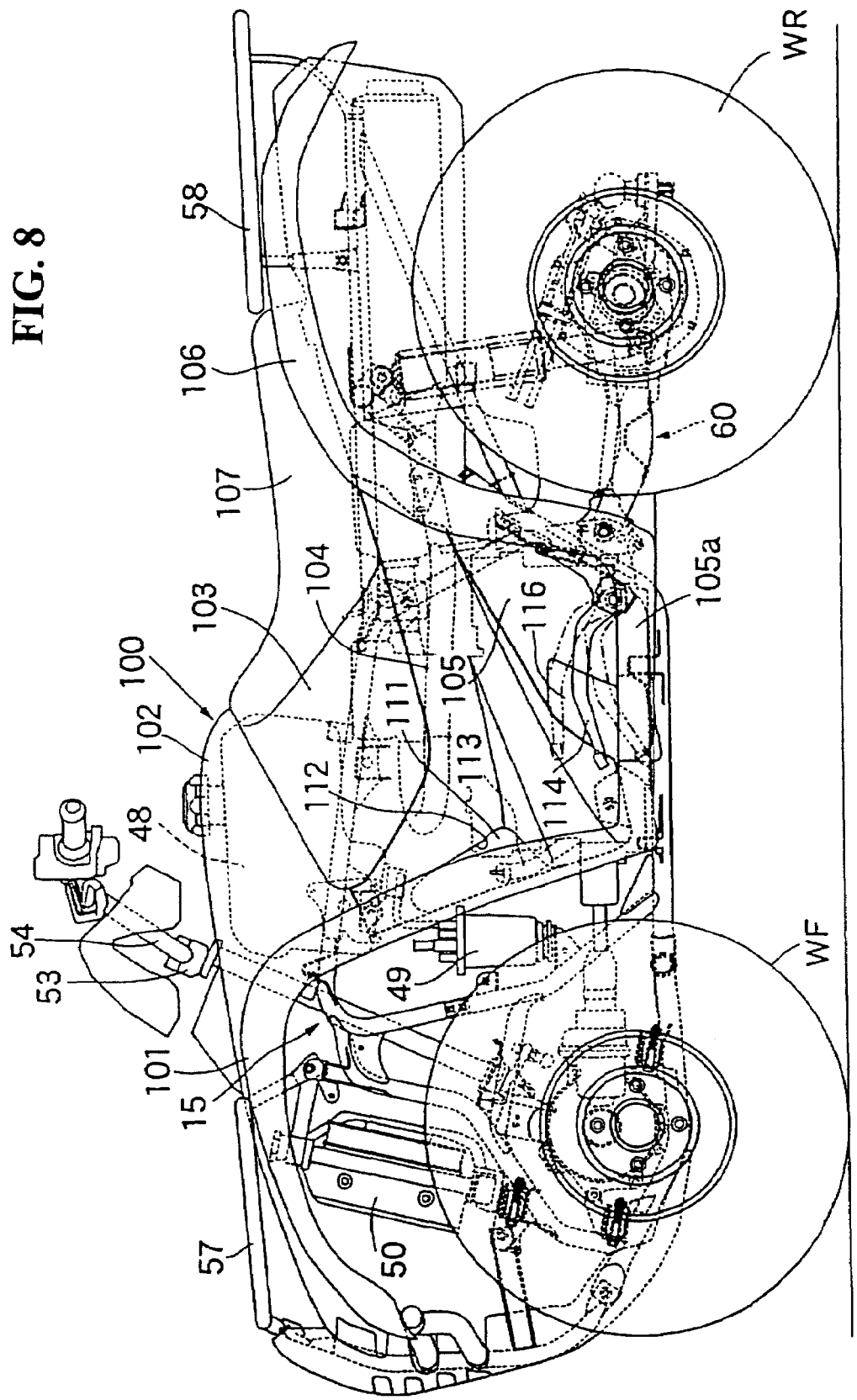
FIG. 8 is a side view of the all terrain vehicle employing the swing arm type rear suspension with its body cover attached.

Referring to FIG. 8, the overall body frame 15 as well as the power unit P, the fuel tank 48 and the air cleaner 45 are covered with a body cover 100. The body cover 100 is composed of a plurality of divided cover members made of a synthetic resin. The cover members include a pair of left and right front fenders 101, a tank cover 102, a pair of left and right knee grips 103, maintenance covers 104, mud guards 105, and rear fenders 106. The respective front fenders 101 cover the front wheels WF from above and behind. The tank cover 102 is disposed between the front fenders 101 so as to cover the fuel tank 48. The maintenance covers 104 are each contiguous with each of a pair of left and right knee grips 103, the lower portion of the tank cover 102, and the lower portion of the knee grip 103. The mud guards 105 are each contiguous with the lower portion of the maintenance cover 104. The rear fenders 106 are each contiguous with the mud guard 105 and the rear portion of the knee grip 103.

Thus, the maintenance cover 104 occupies a large space defined between the knee grip 103 and the mud guard 105 which are vertically spaced apart from each other. When the maintenance cover 104 is removed, a large opening can be provided, which enhances the maintenance performance.

The peripheries of the maintenance cover 104 are in contact with the front fender 101, the tank cover 102, the knee grip 103, the mud guard 105 and the rear fender 106, which are cover members disposed around the maintenance cover 104. With such arrangement of the cover members, the maintenance cover 104 can occupy a large area, thereby enhancing the maintenance performance.

The operator seat 107 is provided on the body cover 100 behind the fuel tank 48 so as to be smoothly contiguous with the rear portion of the tank cover 102 covering the fuel tank 48.

Figure 9:
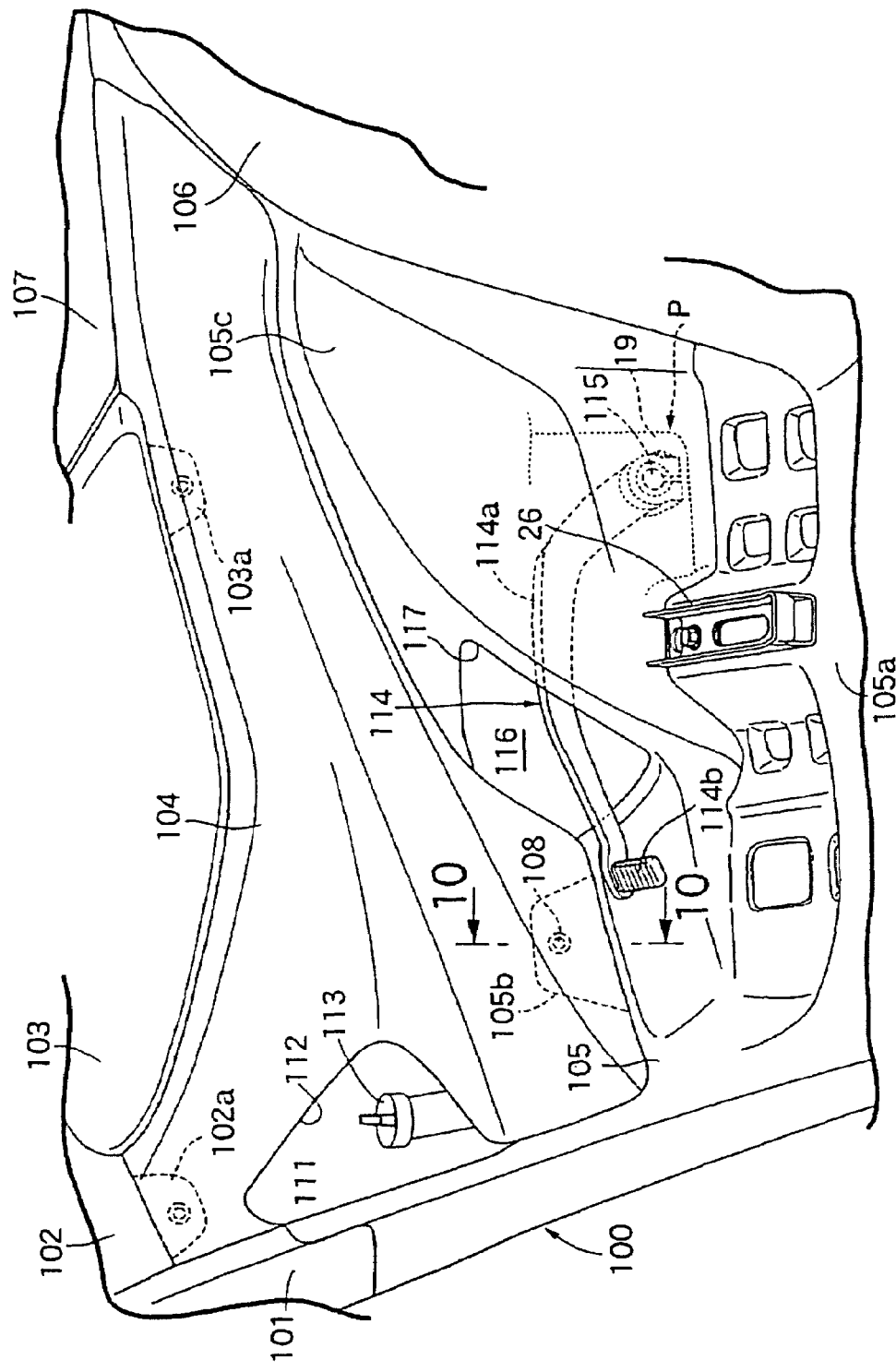
FIG. 9 is a perspective view of part of the body cover.

With reference to FIG. 9, the mud guards 105 have its lower portions formed as step boards 105a on which the operator sitting on the seat 107 and places his or her feet thereon. A step portion 26 is contiguous with the lower pipe 23 of the body frame 15 and is disposed on the step board 105a.

The maintenance covers 104 are each disposed on the side of the power unit P and are detachably connected to the tank cover 102, the knee grip 103 and the mud guard 105 which surround the maintenance covers 104.

Figure 10:
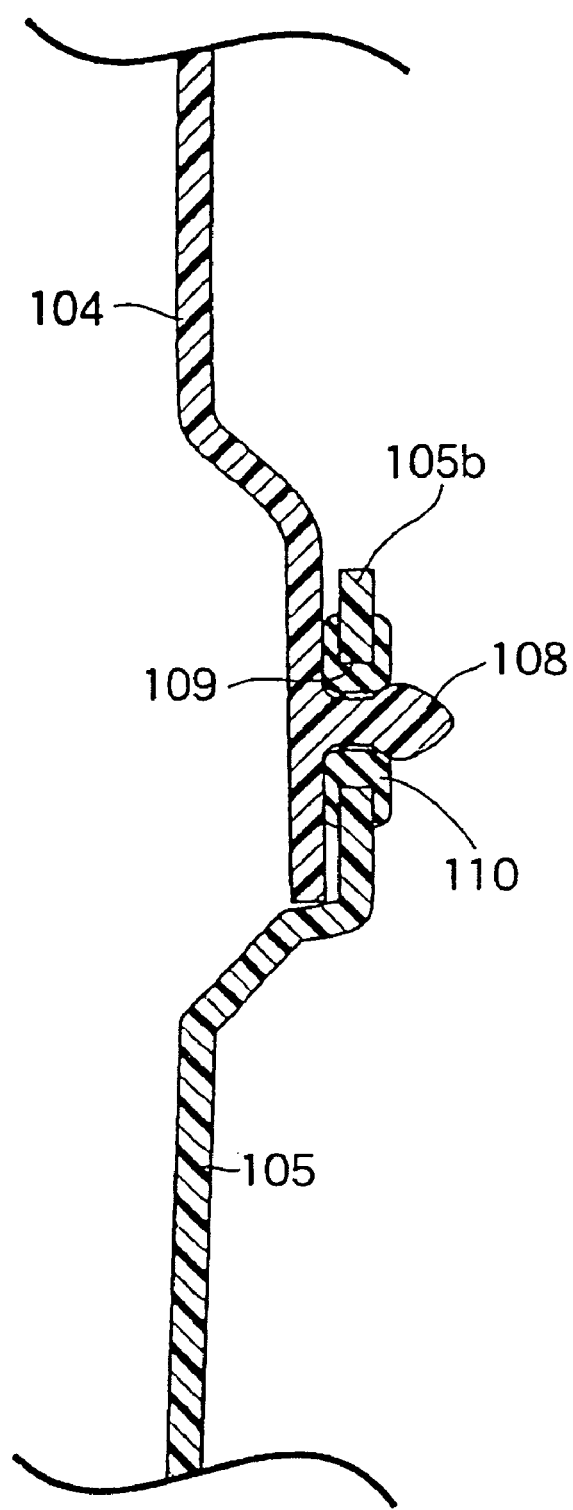
FIG. 10 is a cross-sectional view taken along line 10-10 of FIG. 9.
Figure 11:
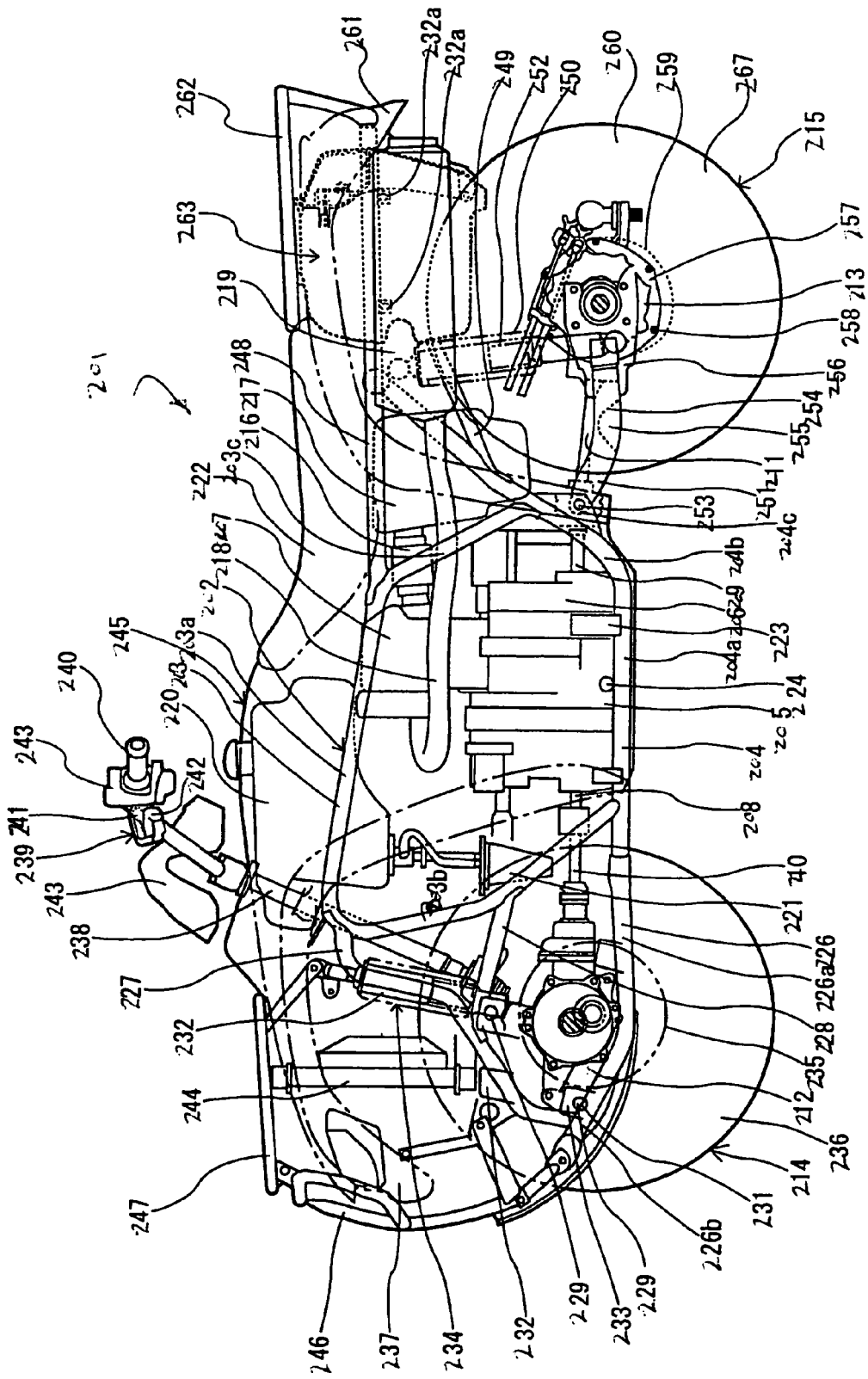
FIG. 11 is a side elevation of a vehicle of an embodiment of the present invention.
Figure 12:
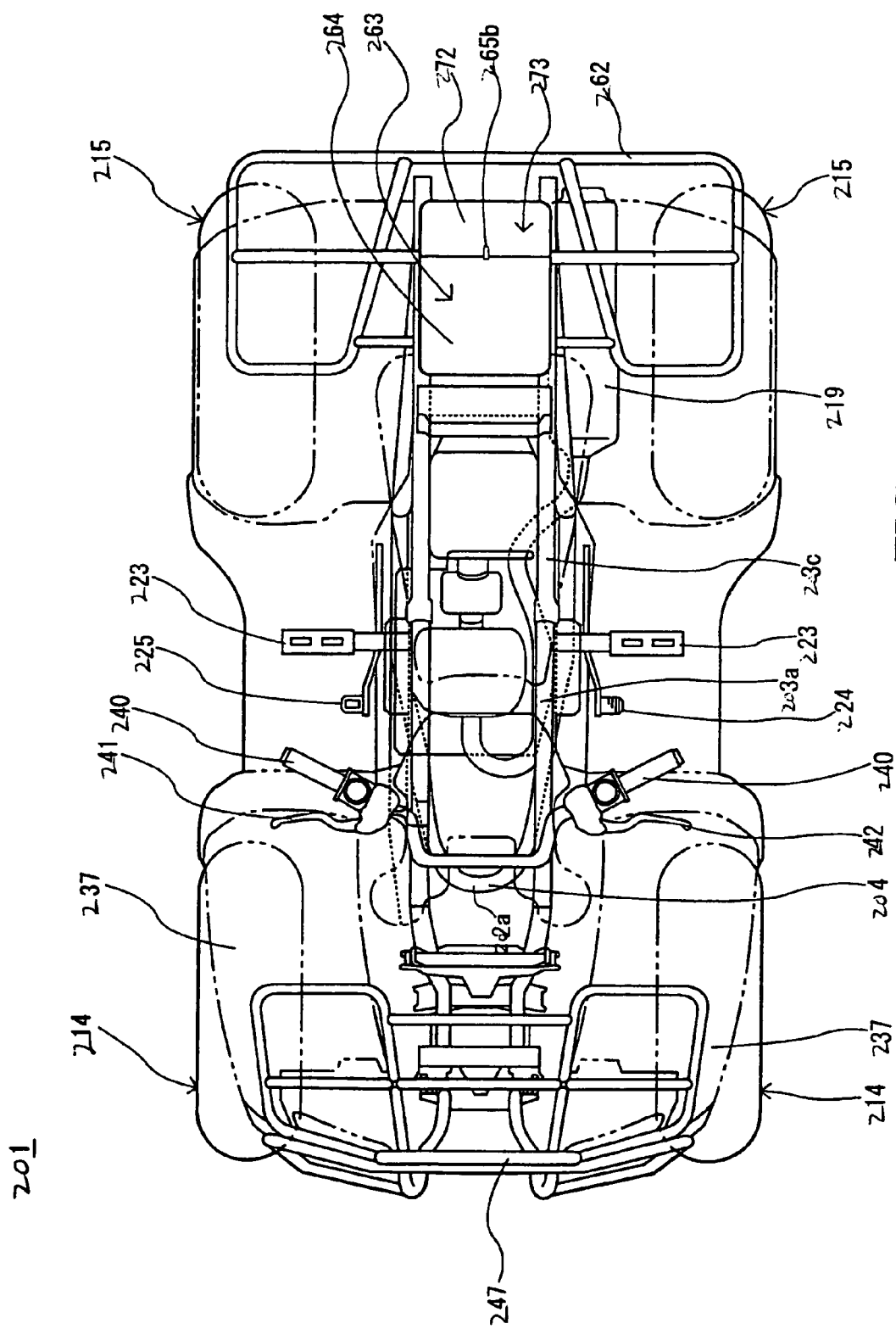
FIG. 12 is a plan view of a vehicle of an embodiment of the present invention.
Figure 13:
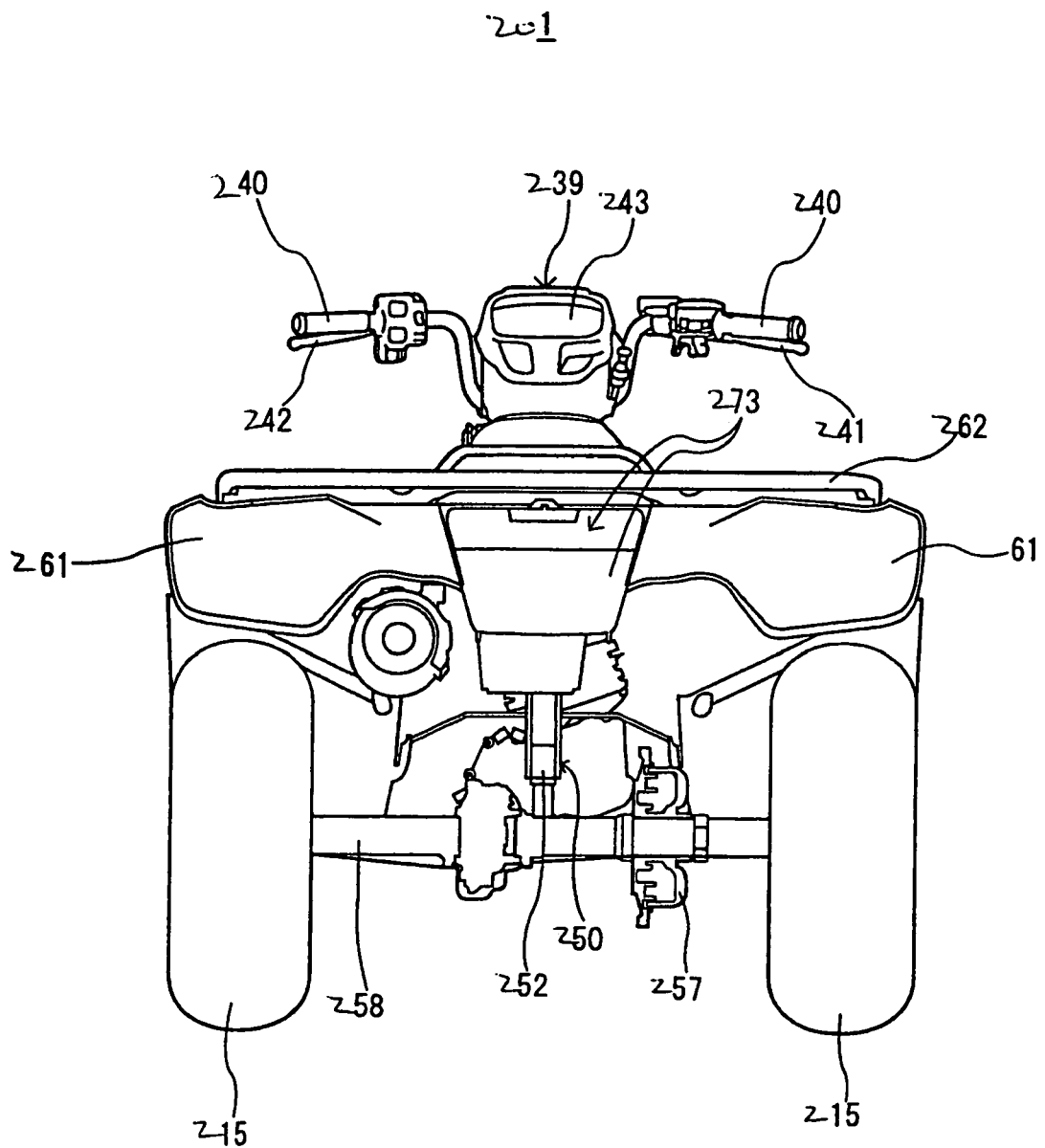
FIG. 13 is a rear view of a vehicle of an embodiment of the present invention.
Figure 14:
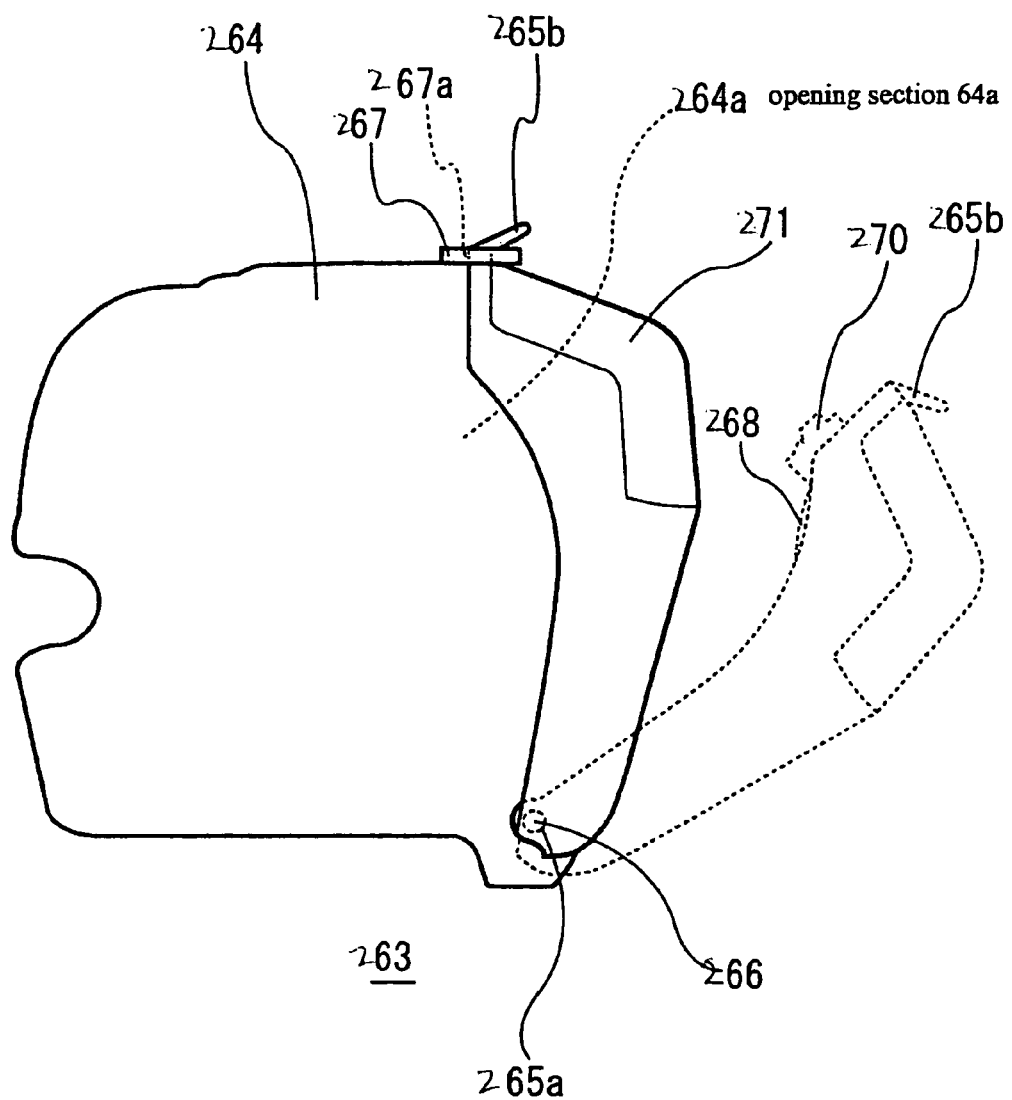
FIG. 14 is a side elevation of a utility box of an embodiment of the present invention.
Figure 15:
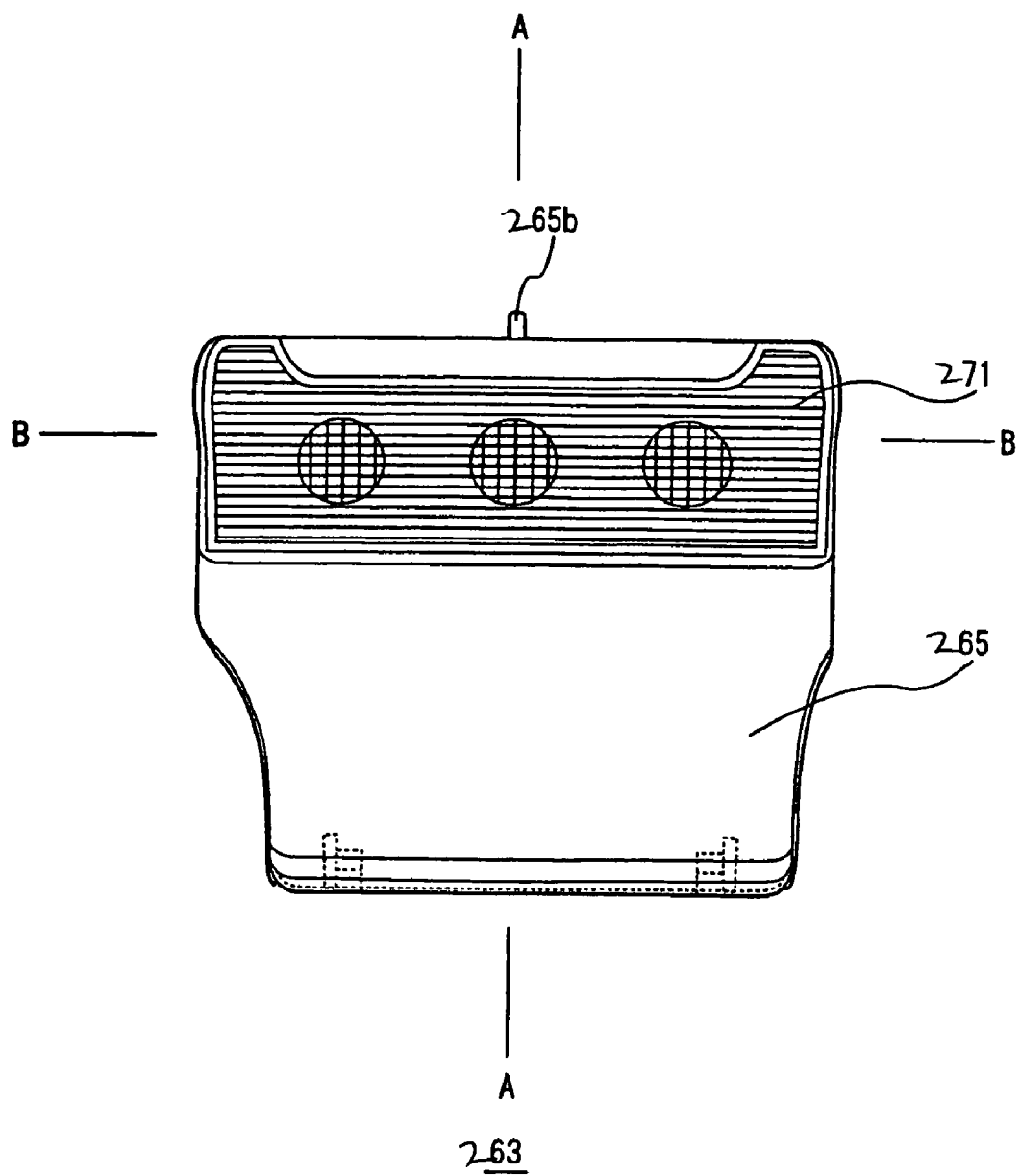
FIG. 15 is a rear view of a lid of an embodiment of the present invention.
Figure 16:
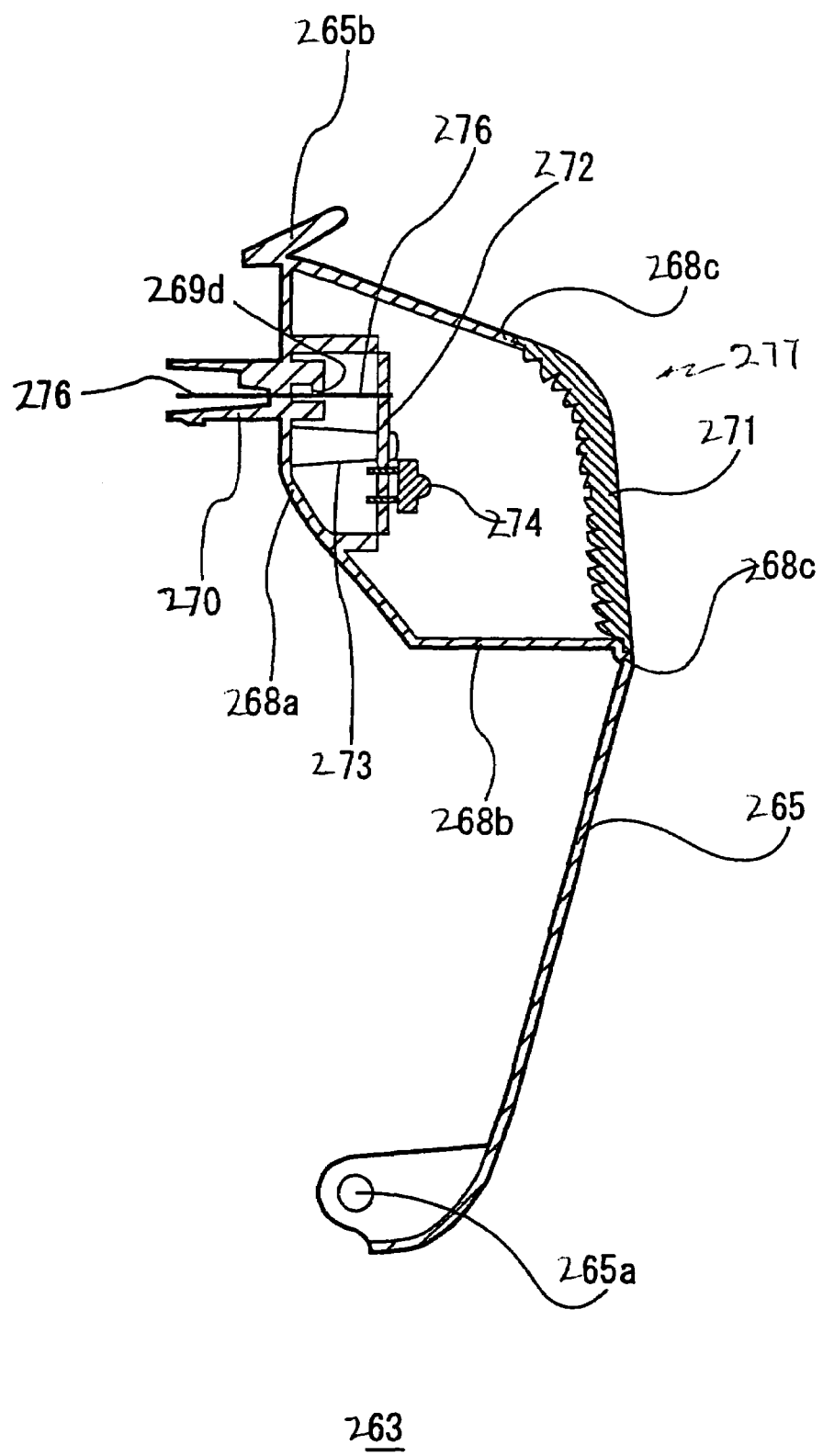
FIG. 16 is a vertical cross section of a lid of an embodiment of the present invention.
Figure 17:
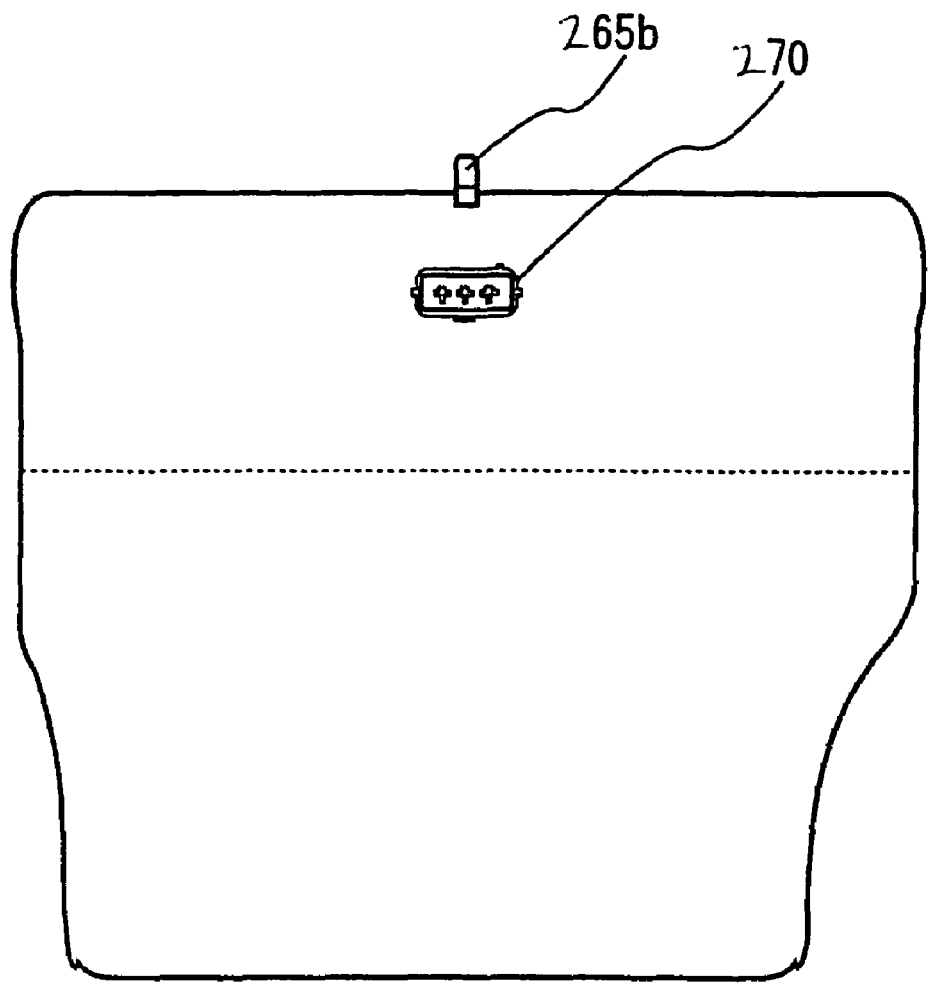
FIG. 17 is a front elevation of a lid of an embodiment of the present invention.
Figure 18:
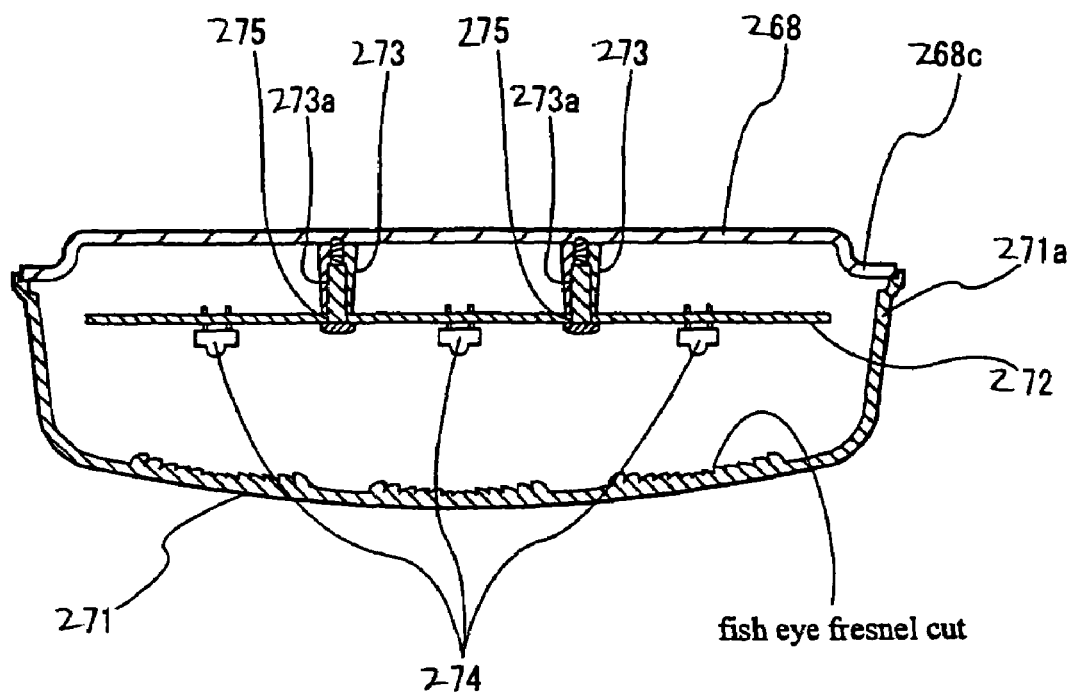
FIG. 18 is a vertical cross section of a lid of an embodiment of the present invention.

In FIG. 10, the maintenance cover 104 is provided with an inwardly projecting engagement-projection 108 at its joint to each of the tank cover 102, the knee grip 103 and the mud guard 105. The tank cover 102, the knee grip 103 and the mud guard 105 are provided with connection plate portions 102a, 103a and 105b, respectively, which lap over the maintenance cover 104 from the inside. The connection plate portions 102a, 103a and 105b are each provided with an attachment hole 109 corresponding to the engagement projection 108. A grommet 110 is attached to the attachment hole 109 for resilient engagement with the engagement-projection 108.

A pair of left and right warm air discharge ports 112 is provided in the body cover 110 so as to discharge warm air generated by the power unit P. The discharge port 112 is defined by the mud guard 105 and a notch formed at the front edge of the maintenance cover 104.

An oil level gauge 113 is attached to the crankcase 19 of the engine E included in the power unit P. The upper end of the oil level gauge 113 faces the left warm air discharge port 112. In other words, the left warm air discharge port 112 also fulfills the function as an opening through which the upper end of the oil level gauge 113 can be observed.

A spindle 115 rotatably projects from the left wall of the crankcase 19 included in the power unit P. The spindle 115 is connected to the gear change mechanism of the transmission accommodated in the crankcase 19. A gear change pedal 114 is secured to the projecting end of the spindle 115. The body cover 100 is formed with an opening 116 on the left side of the power unit P so as to allow the gear change pedal 114 to pass therethrough.

The gear change pedal 114 includes an arm 114a and a treadle 114b. The arm 114a has a proximal portion which is rotatably supported by the power unit P via the spindle 115. The treadle 114b is provided at the leading end of the arm 114a so as to be located on the left side of the power unit P and above the step board 105a. The leading half of the arm 114a is exposed from the opening 116.

Thus, the mud guard 105 is formed with an outward projecting portion 105c at a portion rearwardly of the step board 105a so as to smoothly merge into the rear fender 106. A portion of the arm 114a on the proximal side thereof with respect to the middle portion thereof, namely, on the side of the spindle 115, is located between the power unit P and the projecting portion 105c.

Further, the opening 116 is defined by a notch 117 and the rear edge of the maintenance cover 104. The notch 117 is provided at the joint of the mud guard 105 to the rear edge of the maintenance cover 104.

The arm 118a of a brake pedal 118 is rotatably supported by the right lower portion of the body frame 15. The brake pedal 118 is provided at its leading end with a treadle 118b and projects outwardly from the body cover 100 in the same structure as that of the above-mentioned gear change pedal 114.

The operation of the embodiment will be next described. The lower bracket 63 is provided with the first support hole 65 adapted to swingably support the swing arm 61 suspending the rear wheel WR and with the second support hole 66 adapted to swingably support the independent suspension frame 81 suspending the rear wheel WR. In addition, the lower bracket 63 is attached to the lower portion of the center frame 16 included in the body frame 15. Therefore, the lower bracket 63 can be used for either of the rear suspension systems, the swing arm type and the independent suspension type. A portion of the body frame 15 is allowed to be used for swingably supporting either of the swing arm 61 and the independent suspension frame 81, which results in a cost reduction.

The upper bracket 78 is attached to the rear frame 18 of the body frame 15. In addition, the upper bracket 78 includes a first support portion 78a adapted to support the upper portion of the rear shock absorber unit 62 attached to the swing arm 61, and the second support portions 78b, 78c adapted to support the independent suspension frame 81. Therefore, the upper bracket 78 can be used for either of the rear wheel suspension systems, the swing arm type and the independent suspension type. That is, the body frame 15 is configured such that the upper bracket 78 is applicable to either of the swing arm 61 and the independent suspension frame 81, which results in a further cost reduction.

In addition, since the second support portions 78b, 78c are integrally connected to the first support portion 78a so as to expand to the left and right sides of the first support portion 78a, the independent suspension frame 81 can be securely held by the upper bracket 78. Further, since both the ends of each of the second support portions 78b, 78c are welded to the cross member 77, the rigidity of connection of the upper bracket 78 with the rear frame 18 can be enhanced, which can stabilize the support of the independent suspension frame 81 by the upper bracket 78.

The gear change pedal 114 and the brake pedal 118 which are operatively trodden by the operator sitting on the operator seat 107 are disposed on both sides of the power unit P. The gear change pedal 114 includes the arm 114a having a proximal portion which is placed inside the body cover 110 and is rotatably supported by the power unit P and the body frame 15, and the treadle 114b which is placed outside the body cover 110 and is provided at the leading end of the arm 114a. Similarly, the brake pedal 118 includes the arm 118a having the proximal portion which is placed inside the body cover 110 and is turnably supported by the power unit P and the body frame 15, and the treadle 118b which is placed outside the body cover 110 and is provided at the leading end of the arm 118a. The body cover 110 is formed with the opening 116 on each side of the power unit P so as to allow the middle portion of each arm 114a, 118a to pass therethrough.

Accordingly, the full-cover buggy vehicle can be achieved in which without modification of the structures and arrangements of the gear change pedal 114 and the brake pedal 118, the body cover 110 covers the overall body frame 15 including the power unit P in such a manner that part of each of the gear change pedal 114 and the brake pedal 118 projects outwardly from the body cover 110 (100) and on the side of the power unit P. As a result, the exterior appearance can be enhanced.

On each side of the power unit P, the mud guards 105 of the body cover 100 are each partially outwardly projecting to form the projecting portion 105c. The proximal portions, relative to the middles, of the arms 114a, 118a can each be disposed between the power unit P and the projecting portion 105c. Therefore, a space defined between the body cover 100 and the power unit P can be effectively utilized to dispose each of the respective portions of the gear change pedal 114 and the brake pedal 118 therein.

Further, the opening 116 is defined by the rear edge of the maintenance cover 104 and the notch 117 provided at the joint of the mud guard 105 to the rear edge of the maintenance cover 104. Therefore, the opening 116 can be effectively formed at the joint of the maintenance cover 104 and the mud guard 105 which constitute a portion of the body cover 100, while the opening area of the opening is minimized. This can enhance the external appearance.

In addition, the body cover 100 is configured by joining together the maintenance covers 104 detachably disposed on the side of the power unit P, the front fenders 101, the tank cover 102, the knee grips 103, the mud guards 105 and the rear fenders 106. The body cover 100 covers the power unit P, the fuel tank 48 and the air cleaner 45 as well as the overall body frame 15, whereby the external appearance can be enhanced. In addition, the body cover 100 is sequentially assembled by joining together the front fenders 101, the tank cover 102, the knee grips 103, the maintenance cover 104, the mud guards 105 and the rear fenders 106. This can improve the assembling performance of the body cover 100. Further, since the maintenance covers 104 are attachable and detachable and it is only needed to attach and detach the maintenance covers 104 when the power unit P undergoes maintenance work, the maintenance performance can be enhanced.

The body cover 100 includes the maintenance covers 104, the mud guards 105 disposed below the maintenance covers 104, the knee grips 103 disposed above the maintenance covers 104, the tank cover 102 disposed forward of the knee grips 103 and above the maintenance covers 104, and front fenders 101 disposed forward of the maintenance covers 104, which serve as the cover members. Such an arrangement of the cover members can enhance external appearance.

Since the body cover 100 is provided with the warm air discharge ports 112, warm air can be discharged from the warm air discharge ports 112 despite the provision of the full cover. Heat does not accumulate within the body cover 100 and the upper end of the oil level gauge 113 attached to the power unit P is disposed to face the warm discharge port 112. Thus, the oil level gauge 113 can be checked without detachment of the maintenance cover 104.

In the present invention, since the identical body frame 15 can be selected, then either of the swing arm type or the independent suspension type suspension systems in accordance with the intended drive may be used. Thus, the user's range of use can be expanded and the invention may be made more economically.

The vehicle 201 shown in FIG. 1 is an ATV (All Terrain Vehicle) that improves mobility over uneven ground. A vehicle frame 202 constituting a framework of the vehicle 201 is made up of left and right upper frames 203 and lower frames 204, and forms a loop structure. Also, these left and right loop structures are connected by a plurality of left and right cross members to form a box structure.

Each left and right upper frame 203 includes an upper inclined section 231, having a tubular member made of metal such as aluminum that is curved and arranged to be inclined to the rear at an outer side of an upper section of the vehicle frame 202. A front inclined section 203b extends towards the rear and downwards in an inclined manner from a front end of the upper inclined section. In addition, a rear inclined section 203c extends in an inclined manner rearwards and downwards from a rear end of the upper inclined section 203a. A lower frame 204 includes a lower horizontal section 204a, that is formed to curve in an arc as a result of a curving process applied to a single tubular member made of metal such as aluminum in a front end section 202a of the vehicle frame 202, and arranged substantially horizontally at an outer side of respective left and right lower sections of the vehicle frame 202. A rear inclined section 204b extends upwardly to the rear in an inclined manner from a rear end section of the lower horizontal section 204a. A lower end section of the front inclined section 3b is connected to a front end section of the lower frame 204, and a lower end section of the rear inclined section 203c of the upper frame 203 is connected to the middle of the rear inclined section 204b of the lower frame.

An engine 205 as a motor is mounted in the box structure extending in a longitudinal direction that is constructed at a central section of the vehicle frame 202. The engine 205 is a water cooled single cylinder reciprocating engine, in a so-called vertical layout, with a rotational axis of a crankshaft arranged in a longitudinal direction of the vehicle 201. The engine 205 includes a crankcase section 206, and a cylinder section 207 provided above the crankcase section 206.

A front output shaft 208 is derived in a forward direction from a front part of the crankcase section 206, and a rear output shaft 209 is derived in a rear direction from a rear part of the crankcase section 206. The front output shaft 208 and rear output shaft 209 are respectively connected to a front wheel 214 or rear wheel 215 via a front drive shaft 210 or rear drive shaft 211, and front final reduction gear unit 212 or rear final reduction gear unit 213.

A throttle body 216 is connected to a rear part of the cylinder section 207 of the engine 205, and an air cleaner case 217 is connected to a rear part of the throttle body 216. Also, a base end part of an exhaust pipe 218 is connected to a front part of the cylinder section 207. The exhaust pipe 218 extends in front of the cylinder section 217 and is folded back and extends behind the cylinder section 207 and has a tip end connected to a muffler 219 provided in a rear part of the vehicle.

A fuel tank 220 is provided above the engine 205. The fuel tank 220 is connected to a fuel pump 221 for feeding fuel to the engine 205. A seat 222 for a rider to sit on is arranged behind the fuel tank 220. Steps 223 for the rider are provided below the seat 222 and project outwardly in a lateral direction. A change lever is arranged in front of the left step 223, and a rear brake lever 225 is arranged in front of the right step 223.

Front lower pipes 226 are connected in front of the left and right lower frames 204. A front lower pipe 226 is connected to a front end of a lower horizontal section 204a of the lower frame 204, and has a horizontal section 226a extending to the front horizontally, and a front end section 226b that is erected diagonally to the front. A front cushion pipe 227 is provided between the front end section of the upper inclined section 203a of the upper pipe 203, and the front end section of the front lower pipe 226. A front sub-pipe 228 is connected between the front cushion pipe 227 and the upper frame 203. A cross beam 229 is provided across the left and right front cushion pipes 227 and the left and right front lower pipes 226. A section mainly composed of a respective lower pipe 226, a respective front cushion pipe 227, and a respective crossbeam 229 is made a vehicle frame front section.

A front suspension 231 is provided in the vehicle frame front section. The front suspension 231 is a so-called double wishbone type, mainly comprising left and right upper arms 232 and lower arms 233 provided so as to be capable of swinging up and down, left and right knuckles, not shown, supported on each of the upper arms and lower arms, and left and right front shock absorber units 234 are provided between each of the lower arms 233 and the vehicle frame 202, with a hub section of the front wheels being attached to the knuckles, capable of rotation. Using this type of construction, an impact load acting on the front wheels 214 from the road surface is absorbed by compression of the front shock absorber units 234 via each of the upper arm 232 and the lower arm 233.

Each front wheel 214 is constructed by attaching a comparatively broad low pressure balloon tire 236 to the outer periphery of a wheel 235, and is linked to the engine 205 via a front final reduction gear unit 212, front drive shaft 210 and front output shaft 208. A disk brake unit (not shown) is arranged inside the wheel 235 as a brake for the front wheel 214. The area above and to the rear of the left and right front wheels 214 is covered by a resin type front fender 237.

A steering shaft 238 is fitted to a front end section of the upper frame 203. A lower end section of the steering shaft 238 is connected to a front wheel steering mechanism (not shown), and a steering handle is attached to an upper end section. The handle 239 is provided with grips 240 to the left and right. A front brake lever 41 is arranged close to the left grip, and a clutch lever 242 is provided close to the right grip 240. A meter box 243 is provided at a central part.

A radiator 244 for cooling is arranged in front of the steering shaft 238. Also, at the outside a vehicle cover 245 is provided for covering the vehicle body. A front protector 246 formed from steel is provided further outside of the vehicle cover 245 supported at a front end section of the front lower pipe 226, and a front carrier, in which belongings are placed, is provided above the front protector.

A rear upper pipe 248 as a seat rail is arranged horizontally behind the vehicle frame 202 and is connected to a rear curved section between an upper inclined section 203a and a rear inclined section 203c of each upper frame 203. An upper end section of the rear inclined section 203c is joined to a central section, in a longitudinal direction, of the rear upper pipe 248. A rear sub pipe 249 suspended between rear end sections of the rear upper pipe 248 in a substantially central part in the longitudinal direction of the rear inclined section 203c, inclined upwards to the rear.

A rear suspension 250 for suspending the rear wheels 215 while absorbing shock from the rear wheels 215 includes a swing arm 251 and a rear shock absorber unit 252. The swing arm 251 has a cross member 254 spanning between left and right arm bodies 253 and left and right arm bodies 253 extending in a longitudinal direction. Left and right pivot connection section 255 are provided at front end sections of each arm body 253, and left and right support plates 256 are provided on rear end sections of each arm body 253. The swing arm 251 is formed, for example, by welding these components together. The swing arms 251 are provided one each to the left and right, and are supported so as to be capable of swinging up and down at a pivot bracket 204c forming a flat triangular shape integrally provided at a rear side of the rear inclined section 4b of the lower frame 204. A rear shock absorber unit is arranged sloping forward and upward at a vehicle rear section in the middle in a lateral direction, that is connected close to rear end of the swing arm 251.

A rear final reduction gear unit 213 for converting a drive force from the rear drive shaft 211 to a drive force for the rear axle shaft 258 is attached to a left side support plate 256, with a drum brake unit 257 being attached to a right side support plate 256. The rear axle shaft 258 is rotatably supported to the rear of the swing arm 251 by means of the rear final reduction gear unit 213 and drum brake unit 257.

Each rear wheel 215 is constructed by attaching a comparatively broad low pressure balloon tire 260 to the outer periphery of a wheel 259, and is linked to the engine 205 via a rear final reduction gear unit 213, rear drive shaft 211 and rear output shaft 209. Above and in front of the rear wheels is covered by a resin type rear fender 261, and a rear carrier mainly formed of steel is also attached above this rear fender 261. A utility box 263 formed so as to be capable of storing accessories etc. is arranged between the left and right rear wheels 215. The utility box 263 is fixed to a bracket 232a provided integrally with the rear upper arm 232 using bolt fasteners.

As shown in FIG. 4, the utility box 263 presents a box shape having an opening section 264a facing towards the rear of the vehicle 201, and is provided with a lid 265 capable of opening and closing the opening section 264a. A rubber band 267 having a through hole 267a is fitted to an upper edge center of the opening 264a.

The lid 265 for opening and closing the opening section of the utility box 263 is polycarbonate resin, for example, formed in a substantially rectangular shape for covering the opening section 264a of the main body 264 of the utility box 263 over an area that is about ⅓ of the rear of the upper surface. A rotational shaft hole 265a is provided at a lower end, attached to the utility box main body 264 capable of rotation, via the rotation shaft 266. A hanging section 265b is formed that projects towards the rear and is provided at an upper edge central front end of the lid 265. The lid 265 is opened or closed by inserting the hanging section 265b into a through hole 267a provided in the rubber band 267 supported at the upper end of the opening section 264a, or removing the hanging section from the through hole 267a.

As shown in FIGS. 5 to 8, about the upper ⅓ of the lid 265 reaches both the left and right sides and is formed in a curved shape towards the vehicle in a closed state defining a concave section 268 (case). The concave section 268 has a vertical surface 268a and a horizontal surface 268b, and exhibits a substantially L-shape when viewed in vertical cross section. A coupling hole 269 is provided in the center of the vertical surface 268a. A coupler 270 is formed just past the coupling hole 269, facing towards the inner side of the utility box 263. The coupler 270 is connected to an on-board computer or the like, not shown. A peripheral edge 268c of the concave section 268 has a step section, formed so as to be capable of engaging with a lens 271. Also, a plurality of attachment sections 273 having screw holes 273a for screw fastening of the substrate 272 are integrally formed and aligned with each other in the concave section 268.

The substrate 272 on which circuits are formed is housed in the concave section 268. The substrate 272 faces to the rear of the vehicle, is arranged vertically, and has an LED 274 (light emitting section) mounted in the surface in a longitudinal direction of the vehicle. The substrate is formed of a glass epoxy having an excellent brightness and high reflectance, and constitutes a reflector for reflecting light from the LED 274 towards the rear of the vehicle. An attachment hole 275 is provided between three LEDs 274, and the substrate 272 is attached to the concave section 268 by screw fastening into screw holes 273a via this attachment hole 275. Lead lines 276 from the LEDs 274 etc. pass through the coupler hole 269 and lead out to the coupler 270. An on-board computer, connected to the coupler 270, can regulate the brightness and lighting pattern of each LED 274 by controlling current flowing using information from the rear brake lever 225, front brake lever 241, etc.

A lens 271 is attached to a peripheral edge 268c of the concave section 268 by ultrasonic welding. The lens 271 is formed so that it is flush with a peripheral surface of a concave section 268 of the lid 265. The lens 71 is a fisheye lens having a 180 degree angle of view, and is subjected to Fresnel cutting in fine concentric circles. The lens 71 covers the concave section 268, and refracts and reflects light from the LED 274. A peripheral edge 271a of the lens 271 has a step section, and the step section engages with a peripheral edge 268c of the concave section 268 of the lid 265. The concave section 268 and lighting components such as the substrate 272, LED 274 and lens 271 are housed in the concave section constitute a tail light 277.

A manufacturing process for the tail light 277 of this embodiment will now be described. First of all, the lid 265 having the concave section 268 is formed by molding, with polycarbonate etc. At this time, an attachment section 273 having a coupler 270 and screw holes 273a is formed in the concave section 268. Next, a substrate 272 on which circuit components and an LED 274 are mounted is assembled in the concave section 268. At this time, the substrate 272 is attached to the concave section 68 at a position where lead lines 76 are lead out from the coupler hole 269 to the coupler 270. Next, a peripheral edge 271a of the lens 271 and a peripheral edge 268c of the concave section 268 are fitted together to engage the lens 271 in the lid 265, and the lens 271 is attached to the concave section 68 by ultrasonic welding. In this manner the tail light 277 is constructed in the lid 265.

The light structure for the tail light 277 of the above described embodiment achieves the following effects.

Since the tail light 277 is constructed having lighting components such as the substrate 272 and LED 274 directly assembled in the concave section 268 integrally formed with the lid 265, the number of components is reduced, and it is also possible to reduce the number of manufacturing steps. Also, conventionally a light unit is fitted into a storage section formed in a vehicle for each case, but the tail light 277 of this embodiment can be formed with a concave section 268 acting as both the case and storage section of the related art being of such a size as to be capable of housing lighting components such as the substrate 272. Therefore, it is possible to make the space smaller as compared to the related art where the storage section needs to be constructed in accordance with the size of the light unit. Accordingly, by making the concave section 268 jutting to the inside of the utility box 263 smaller, it is possible to ensure more storage space for the utility box 263. Further, since the tail light 277 is constructed at an upper end and rear end of the utility box 263, there is no partition of storage space compared to the case where the utility box is provided at a separate position such as in the middle in a vertical direction. Thus, it is possible to store large items such as a helmet. Also, in the event that the tail light 277 is formed at the lower end, it is necessary to consider a layout, such as an interference with the lid 265 when storing large items. However, since the tail light 277 is formed at the upper end, it is possible to store large items first. By making the peripheral edge 271a of the lens 271 align with both left and right edges, it is possible to make the tail light 277 large. Also, the lens 271 is attached flush to the lid 265, there is no jutting out due to being flush to the peripheral surface of the concave section 268, and external appearance is improved.

The present invention is not limited to each of the above described embodiments, and it will be evident that each embodiment can be appropriately modified within the technical gist and scope of the present invention. The number, position, shape and size, etc. of the above described structural members is not limited in the embodiments, and preferred numbers, position, shape and size for realizing the present invention are possible. For example, the number and arrangement of LEDs is not limited to the above-described embodiment, and other numbers and arrangements are possible. In the above-described embodiment, a description has been given of a structure where a concave section 268 is formed in a lid 265 of a utility box 263, but it is possible, for example, to form the concave section 268 at other positions and members such as the rear fender 261. Also, a description has been given for a case of a tail light 277 provided to the rear of a vehicle 201, but it is also possible to apply the tail light to other positions and applications such as providing a head light to the front. In the above described embodiment description has been given for the case where the vehicle 201 is an ATV, but the present invention can also be used in other two-wheel drive vehicles, four-wheel drive vehicles and motorcycles. A description has been given for the case where the LED is attached facing to the rear, but it is also possible to have other directions, for example, an arrangement where the substrate 272 is horizontal, or an arrangement where the LED 274 faces downwards. A description has been given in the above embodiment for the case where as lighting components a substrate 272 and LED 274 are housed, but the present invention is not limited to an applicable to other components. For example, it is possible to use a lamp instead of the LED as a light emitting body. In the above described embodiment description has been given for a structure where the lens 271 is attached by ultrasonic welding, but it is also possible to form the lens 271 to be capable of being fitted to the peripheral edge 268c of the concave section 268, and attach the lens 271 by engaging with the concave section 268.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cover structure for a buggy vehicle which contains a power unit and a fuel tank disposed above the power unit, said power units and fuel tank being mounted on a body frame and an operator's seat is disposed rearwardly of the fuel tank, said cover structure comprising:

a body cover for covering the overall body frame as well as the power unit and the fuel tank, the body cover being formed by joining together a plurality of cover members including maintenance covers which are detachably disposed on the side of the power unit, a knee grip and a mud guard forming parts of the plurality of cover members and vertically spaced apart from each other so as to position the maintenance covers therebetween, wherein the body cover includes said maintenance covers with the mud guard being disposed below the maintenance covers and the knee grip being disposed above the maintenance covers, a tank cover disposed forward of the knee grip and above the maintenance covers with a front fender being disposed forward of the maintenance covers, which serve as the cover members, and wherein the maintenance covers are each disposed on the side of the power unit and detachably connected to the tank cover, the knee grip and the mud guard which surround the maintenance covers.

2. The cover structure for a buggy vehicle according to claim 1, wherein the body cover is provided with a warm air exhaust port, said warm air exhaust port being defined by the mud guard and a notch formed at the front edge of the maintenance cover.

3. The cover structure for a buggy vehicle according to claim 2, wherein the body cover is formed with an opening for observing an oil level gauge attached to the power unit.

4. The cover structure for a buggy vehicle according claim 3, wherein the body cover includes the maintenance cover with the mud guard being disposed below the maintenance cover and the knee grip being disposed above the maintenance cover, a tank cover is disposed forward of the knee grip and above the maintenance cover with a front fender being disposed forward of the maintenance cover, which serve as the cover members.

5. The cover structure for a buggy vehicle according claim 2, wherein the body cover includes the maintenance cover with the mud guard being disposed below the maintenance cover and the knee grip being disposed above the maintenance cover, a tank cover is disposed forward of the knee grip and above the maintenance cover with a front fender being disposed forward of the maintenance cover, which serve as the cover members.

6. The cover structure for a buggy vehicle according to claim 1, wherein the body cover is formed with an opening for observing an oil level gauge attached to the power unit.

7. The cover structure for a buggy vehicle according claim 6, wherein the body cover includes the maintenance cover with the mud guard being disposed below the maintenance cover and the knee grip being disposed above the maintenance cover, a tank cover is disposed forward of the knee grip and above the maintenance cover with a front fender being disposed forward of the maintenance cover, which serve as the cover members.

8. The cover structure for a buggy vehicle according to claim 1, wherein the body cover is formed with an opening on the side of the power unit so as to allow a pedal to pass therethrough, said opening being defined by a notch and the rear edge of the maintenance cover, said notch being provided at the joint of the mud guard with the rear edge of the maintenance cover.

* * * * *